United States Patent
Okamoto et al.

(10) Patent No.: US 6,633,231 B1
(45) Date of Patent: Oct. 14, 2003

(54) COMMUNICATION DEVICE AND AUXILIARY DEVICE FOR COMMUNICATION

(75) Inventors: Kazutaka Okamoto, Miyanohigashi-machi (JP); Noboru Hayakawa, Miyanohigashi-machi (JP); Hiroyuki Ebi, Miyanohigashi-machi (JP)

(73) Assignee: Horiba, Ltd., Kyoto (JP)

( * ) Notice: Subject to any disclaimer, the term of this patent is extended or adjusted under 35 U.S.C. 154(b) by 197 days.

(21) Appl. No.: 09/589,017

(22) Filed: Jun. 6, 2000

(30) Foreign Application Priority Data

| Jun. 7, 1999 | (JP) | 11-159291 |
| Jun. 7, 1999 | (JP) | 11-159321 |
| Jul. 26, 1999 | (JP) | 11-210608 |
| Jul. 26, 1999 | (JP) | 11-210635 |
| Aug. 27, 1999 | (JP) | 11-242072 |
| Aug. 31, 1999 | (JP) | 11-244857 |

(51) Int. Cl.⁷ .................... G08B 1/08; H04M 11/04
(52) U.S. Cl. .................. 340/539.11; 340/539.25; 340/539.26; 348/14.01; 348/158; 455/575.1; 379/38; 379/40; 379/43; 379/51
(58) Field of Search .................. 340/539, 531; 348/14.01, 14.1, 158, 309; 379/37–39, 51, 40, 455, 43, 42; 455/575

(56) References Cited

U.S. PATENT DOCUMENTS

| 4,737,847 A | * | 4/1988 | Araki et al. ............ 348/161 |
| 4,951,147 A | * | 8/1990 | Aknar et al. ............ 358/209 |
| 5,396,269 A | * | 3/1995 | Gotoh et al. ............ 379/53 |
| 5,414,444 A | * | 5/1995 | Britz ................... 345/156 |
| 5,521,634 A | * | 5/1996 | McGary ................ 348/169 |
| 5,712,679 A | * | 1/1998 | Coles .................. 348/158 |
| 5,726,660 A | * | 3/1998 | Purdy et al. ........... 342/357 |
| 5,910,815 A | * | 6/1999 | Boursier et al. ........ 348/14 |
| 6,278,884 B1 | * | 8/2001 | Kim ................... 455/556 |

* cited by examiner

Primary Examiner—Donnie L. Crosland

(57) ABSTRACT

A surveillance system utilizing a plurality of communication devices that are operative with portable telephones to permit an easily reconfigurable remote surveillance area. The portable telephones can have audio and imaging transmitting functions and at least one has an audio and imaging receiving function. An image sensor can sense images within a predetermined area and is operatively connected to a portable telephone for providing an output signal upon detection of a predetermined amount of change in the image area. An auto-dialing section is connected to a first telephone for calling a second remote telephone automatically based on the output signal. Infrared detecting sensors can also image within the surveillance area and be utilized to activate the auto-dialing function. The portable telephones can further include an image sensor for providing an image of the surveillance area.

31 Claims, 31 Drawing Sheets

COMMUNICATION DEVICE AND AUXILIARY DEVICE FOR COMMUNICATION

BACKGROUND OF THE INVENTION

1. Field of the Invention

The present invention relates to a communication device and an auxiliary device for communication and more particularly to a surveillance system that employs remote communication devices that can provide detection capabilities.

2. Description of the Prior Art

There has been available, for example, a communication device in the fields of crime prevention and fire prevention, associated with security systems each working under a contract with a security company, in order to protect properties such as buildings, warehouses and others. These devices can utilize surveillance sensors such as a smoke sensor, a thermal sensor, and an infrared sensor placed at predetermined sites in a building and establish an on-line connection with a surveillance center of the security company through indoor wiring.

A security contract fee relating to such a system, however, can be highly expensive and therefore, there has been only a minor proliferation of such security systems in the home management field. In addition to such poor proliferation, there has been a problem since, in a case where an abnormality is detected such as a fire at the surveillance center, the fire may grow to a large scale during the time period a guard or guards are on the way to the scene. Further, in a case where the abnormality is an intrusion by an unauthorized person, the intruder, could successfully complete an intended crime and leave the site of the crime before a guard or guards arrive at the site.

A more substantial security system to cope with such situations requires installment of a crime/fire prevention camera, which causes another problem in the home management field since the security contract fee is further raised according to the camera or cameras installed.

Furthermore, even if a security contract is concluded in home management, usually only abnormality detection is conducted at a surveillance center, but a subscriber on the move outside the home may not have immediate knowledge of an abnormality in the home.

In the fields of welfare and medical care, there are cases which require a constant care by a helper because of accompaniment of dangers and insecurities if no helper is available, for example, cases where an elderly person behaves abnormally, a condition where a patient in bed changes rapidly, and a baby or an infant has woken up. In such cases, however, there frequently arise a great burden in said constant care and the daily life of the family members, which limits the ability of the care providers to leave home. With such circumstances as the background, realization of a low cost security system has been strongly desired in the aspects of the crime/fire prevention, and welfare and medical care.

As one of the communication devices to achieve such a desire, there has been a proposal to provide a device which survey the outputs from various kinds of sensors and transmits surveillance information from the sensors to a portable terminal (PHS) for receiving the surveillance information from a transmitting means, so that information on abnormality occurrence can be sent to the PHS (see Japanese Laid Open Application No. 97-54886 for example).

In the above described system, a construction is adopted in which the various kinds of sensors, output surveillance means and transmitting means for surveillance information are online connected with a telephone line and therefore, there has been still another problem since not only is a placement work of the sensors necessary, but the subscriber cannot change arbitrarily installment sites of the sensors because surveillance by the sensors is conducted at a surveillance center. In addition to this problem, there has arisen a still further problem since all the pictures of surveillance, shot by, for example, the cameras installed at many different points, are watched collectively at the surveillance center side and the occurrence of an abnormality may be difficult among all the picture information. With such a prior art background, in order to precisely detect various factors for an abnormality occurrence, a necessity has arisen that various sensors (a fire sensor, crime sensor and other sensors) serving as suppliers of judgment standards are employed in an auxiliary manner and thereby, a crime prevention facility has become more complex according to the employment of such sensors, which causes an inevitable increase in cost of a contract with the surveillance center.

SUMMARY OF THE INVENTION

The present invention has been made in light of such circumstances and it is an object of the present invention to provide a communication device enabling remote surveillance of any intruder or a fire in order to protect a property and to provide remote safety confirmation of human life, precisely in real time at a low cost by individuals, singularly or in a small number, without relying on a security company, a hired helper or the like.

A communication device to achieve the object, according to a first aspect of the present invention comprises: infrared detecting unit for detecting infrared rays, provided to a holder base for a portable telephone equipped with speech and image transmitting functions on commercial electromagnetic waves or to a vessel connected to the holder; and an auto-dialing instruction originating section for calling a preset telephone equipped with an image display function as a recipient automatically based on a predetermined output signal from an infrared detecting unit, provided to one of the portable phone, the holder for the portable telephone or to a vessel connected to the holder.

As a portable telephone equipped with an image transmitting function as described above, there can be exemplified various types of portable telephones: in which an image pick-up unit for an image is included; in a holder for which the image pick-up unit is included or in a vessel connected to the holder for which the image pick-up unit is included; and to which the image pick-up unit is connected by wired or wireless communication links so as to be located at a remote site from the portable telephone and the holder therefor.

In crime/fire prevention, for example, the communication devices with the above described construction and arrangement are preferably positioned at as many sites as possible in a building, a warehouse and so on, while, on the other hand, a telephone with an image display function (hereinafter referred to as a "telephone on the recipient side", for convenience) which can be different from a portable telephone that a communication device would comprise (hereinafter referred to as a "telephone on the sender side", for convenience) is made ready to use and the telephone on the recipient side is set so as to be addressed by the auto-dialing instruction originating section. It should be appreciated that the telephone on the recipient side may be of either an installed type or a portable type, and the portable type is preferable if a recipient is frequently on the move outside the home or office.

With such an arrangement, in a case where a suspicious person intrudes into a warehouse or the like, infrared rays radiated by the intruder are caught by the infrared detecting unit when the intruder enters the effective range of the communication device, or in a case where a fire breaks out, infrared rays radiated by a flame is caught by the infrared detecting unit, and a predetermined output signal is generated from the infrared detecting unit and thereby, the auto-dialing instruction originating section calls a preset, specified telephone on the recipient side automatically.

Since the telephone on the recipient side has a function of displaying picked-up image information (which is a still image or a dynamic image, but in the present specification, simply referred to as an "image") sent from the sender side, a picture and voice of the suspicious person are transmitted in a case of intrusion of the suspicious person or a picture image of the fire and a series of crackling sounds generated by the fire are transmitted in a case of a fire, if the telephone on the recipient side is switched to a communication session. Hence, if the telephone on the recipient side is of a portable type, the recipient, wherever she or he is, can recognize each of the actual situations with certainty in real time. Further, a picture image obtained by shooting the person under surveillance with certainty can be transmitted since infrared rays radiated by a person under surveillance is detected and a picture is transmitted based on a predetermined output from the infrared detecting unit.

Therefore, when such an unwanted situation is recognized, the recipient can request, using the telephone on the recipient side, a rescue from selected, appropriate other people such as acquaintances residing in the neighborhood in addition to a police department or fire department, and especially when the telephone on the recipient side is a portable type, the recipient can prepare conditions of readiness to prevent crime or fire at an early time period from wherever the recipient is located.

Further, when a communication device with the above described construction on the sender side is placed, for example, at an exit/entrance such as a front door, a rear door and so on, a person who passes through each of the doors is caught by the infrared detecting unit, or when the communication device with the above described construction is placed, for example, around a patient in a bed or a baby or an infant in a crib or the like, movements of a human body (the patient in bed and the baby or infant in a crib) are caught by the infrared detecting unit and based on the particular outputs, the telephone on the recipient side is automatically called. With such arrangement, detection of an incoming visitor can be remotely detected in addition to cases where an elderly person loiters or behaves abnormally, a condition of a patient in bed changes rapidly, and a baby or infant has woken up.

Still in addition to the above cases, when a communication device with such a construction is placed adjacent an auto-bicycle or at appropriate positions in the cabin of a car or the like, detection and notification based thereon when robbery or theft occurs on a car can be performed by a telephone on the recipient side and in this case, it is preferable that an image recording device is externally connected to the telephone on the recipient side and picked-up image information from the communication device on the sender side is recorded.

That is, when a person at the scene of a fire is recorded in an image recording device, a fire could be revealed to be arson or when theft occurs and a person is recorded in the image recording device, then the recorded image can be a clue to specify a criminal, and in the cases, the respective recorded images can be evidence for arson and theft. A power supply to a holder for a portable telephone in certain cases may be satisfactorily performed through a cigarette lighter section or from batteries in the cabin.

Furthermore, in the field of agriculture, when communication devices with the above configuration are placed, for example, at predetermined sites inside a structure such as a vinyl greenhouse, offenses by wild animals can be detected.

According to the first aspect of the present invention, since the telephone on the recipient side is equipped with an image display unit, it can be confirmed visually in a remote manner whether a calling information source of the telephone on the sender side is an intrusion of a suspicious person or a breaking-out of a fire and in addition to this, various worrisome events can be confirmed visually in a remote manner, such as the presence of a visitor, loitering of an elderly person, a rapid change in condition of a patient in bed, waking up of a baby or an infant, a criminal in a robbery or theft of a car, a burglar into a home and offenses of a wild animal. Still in addition to these, since the telephone on the recipient side is equipped with an image display function, there is no need to externally connect an image display device, thereby enabling the communication device to contribute to emergencies in various situations.

Accordingly, measures for crime and fire prevention and medical care can be performed with essentially no mistakes and since the scene can be actually confirmed with an image even in malfunctioning of an infrared sensor and on reception of false information on small animals as well, immediate dispatch to the scene to be otherwise caused by false information and fruitless efforts associated therewith can be avoided.

A second aspect of the present invention is directed to a communication device equipped with a telephone conversation function used on commercial magnetic waves comprises, a transmitting unit for transmitting an image shot using an image pick-up unit to a recipient; and an infrared detecting unit and a dialing setting unit for calling a preset telephone with a image display function of the recipient, wherein a predetermined output signal from the infrared detecting unit is entered into the dialing setting unit, so that the preset telephone with a image display function of the recipient is automatically called.

According to the above described construction and arrangement, on one hand, in cases of crime and fire prevention, the communication devices with the above construction are preferably placed at as many predetermined sites as possible in a building using holders, etc., warehouse and others, while on the other hand, a telephone equipped with an image display function (hereinafter referred to as a "portable telephone on the recipient side", for convenience) which may be different from the communication devices (hereinafter referred to as "portable telephones on the sender side", for convenience) is made ready for use and a directory number of the telephone on the recipient side is entered into a dialing setting unit of the portable telephone on the sender side. With such an arrangement and operation, in a case where a suspicious person intrudes into a warehouse and other buildings, infrared rays radiated by the intruder is caught by the infrared detecting unit when the intruder moves around in the neighborhood of the portable telephone, or in a case where a fire breaks out, infrared rays radiated from a flame is caught by the infrared detecting unit, and a predetermined output signal is entered into the dialing setting unit, so that the dialing setting unit calls the telephone on the recipient side automatically.

That is, since a communication device of the second aspect of the present invention is equipped with a transmitting unit for transmitting a shot image to a recipient, and since the telephone on the recipient side is equipped with an image display unit for displaying a shot image information, it can be visually confirmed whether a call information of the portable telephone on the sender side is an intrusion of a suspicious person or a breaking-out of a fire and further which of the presence of a visitor, loitering of an elderly person, a rapid change in condition of a patient in bed, waking up of a baby and infant, criminal in robbery or theft on a car, a burglar into the home and offenses of a wild animal occur.

When a communication device is equipped with one of a sensor sensing infrared rays of 10 μm in wavelength radiated from a human body and a sensor sensing infrared rays in the vicinity of 4.3 μm in wavelength radiated from a flame, both serving as an infrared sensor included in an infrared detecting unit, it can be precisely confirmed whether a command of auto-calling of a specified telephone is issued by a human body detecting sensor, by a fire detecting sensor, or by both.

A communication device of a third aspect of the present invention is characterized by having a transmitting unit for transmitting a shot image using an image pick-up unit to a recipient and line setting unit for calling a preset communication device with an image display function of the recipient, wherein a predetermined output signal is entered into the line setting unit on a predetermined change in the imaged pixels constituting a target subject among pixels detectable by the image pick-up unit as the timing of initiating a call, so that the preset communication device with an image display function of the recipient is automatically called.

A communication device of a fourth aspect of the present invention is characterized by having a line setting unit for calling a preset communication device with an image display function of the recipient, wherein a predetermined output signal is entered into the line setting unit when a change in a target straight line constructed of a plurality of pixels constituting a target subject among pixels detectable by the image pick-up unit as the timing of a call operation, so that the preset communication device with an image display function of the recipient is automatically called.

Furthermore, a communication device of a fifth aspect of the present invention having a transmitting unit for transmitting a shot image using an image pick-up unit to a recipient and a line setting unit for calling a preset communication device with an image display function of the recipient, wherein a predetermined output signal is entered into the line setting unit that would be transmitted when a change in a plurality of straight line pixels or a given area constructed of a plurality of pixels constituting a subject among pixels detectable by the image pick-up unit occurs, so that the preset communication device with an image display function of the recipient is automatically called.

The image pick-up unit of the communication device with such a construction and arrangement are preferably placed at as many predetermined sites as possible in a building, warehouse and other locations as necessary, while a communication device equipped with an image display function (hereinafter referred to as "communication device on the recipient side", for convenience) which may be different from the communication devices (hereinafter referred to as "communication devices on the sender side", for convenience) is made ready for use. A transmission line of the communication device on the recipient side is preset in the line setting unit of the communication device on the sender side. With such an arrangement and operations, crime and fire prevention can be achieved.

That is, in a case where a suspicious person intrudes into a warehouse or other buildings, the instant at which a part of a subject shot by the image pick-up means changes by movement of an intruder when the intruder moves around in the vicinity of the image pick-up unit acts as a timing signal for calling, and a predetermined output signal is entered into the line setting unit. Alternately, in a case where a fire breaks out, the instant at which a part of an image of the target subject changes by a swaying of a flame acts as a timing signal for calling, and a predetermined output signal is entered into the line setting unit. Thereby, the line setting unit calls the communication device on the recipient side automatically.

It should be appreciated that, in general, it is possible to use any detectable change in the pixels of a shot image of a surveillance objective as establishing a change in the subject image. In this case, however, such a device may become too expensive since a high performance image processing section and a high performance arithmetic processing section are necessary to detect such a change and in addition to this, the power consumption increases, which in turn, requires a large capacity power supply and limits the portability of the drives. Furthermore, even a change in image that is not problematic, such as a change in image, shot by the imaging unit, caused by movement of a small animal or by sways of a lifeless object under the influence of a wind has a possibility of being detected. Hence, a predetermined part of a subject target from an image of a surveillance object shot by the image pick-up unit is preset and only a change in that the part of the target subject is preferably detected.

In such a way, since the transmitting unit for transmitting a shot image to a recipient is equipped to the communication device on the sender side and since the image display unit for displaying image information is equipped to the communication device on the recipient side, it can be visually confirmed whether a calling information source of the portable communication device on the sender side is an intrusion of a suspicious person or a breaking out of a fire, and in addition to this, it can be visually confirmed further which of the presence of a visitor, loitering of an elderly person, a rapid change in condition of a patient in bed, waking up of a baby or infant, criminal in robbery or theft on a car, a burglar into the home and offenses of a wild animal occur, etc. so that measures for crime and fire prevention, medical care and so on can be performed with no mistakes, or alternately since the scene can be actually confirmed even when there is a malfunctioning of an infrared sensor, false information on small animals and others, fruitless efforts such as immediate dispatch to the scene otherwise caused by false information can also be avoided.

When the image is formed from infrared rays, a conspicuous light source for shooting is unnecessary, thereby enabling an installment site for the communication device as a crime preventive device so as not to be conspicuous. Further, an active light source is not necessary in a case where far-infrared rays which a human body can radiate are picked up by the imaging unit, thereby not only enabling more certain crime prevention to be implemented, but eliminating false recognition of a change in a subject such as sways of a lifeless thing under the influence of air streams. On the other hand, in a case where a picture is picked up using a light source of near infrared rays, a person can be discerned with more ease since a human image even in the dark can be picked up as a picture image close to a visible light image.

Further, when a sender side and a recipient side have communication devices, the recipient side can remotely communicate with a site of occurrence of an abnormal situation in an interactive manner with image and speech since the communication devices have an image pick-up unit and a transmitting unit for transmitting shot image information to a recipient. Further, when each of the sender side and the recipient side has a proper, plural number of the devices at hand, a surveillance area, for example, can be expanded according to the number of rooms or the number of houses to be surveyed or a further reinforcement in a surveillance system and a cooperation in crime prevention and fire prevention can be expected through a network of family members, relatives, friends, acquaintances, people in the close neighborhood and others.

In a case where a daughter device to which at least an image pick-up unit as described above can be connected so as to enable wired or wireless communication to be provided, a location of the image pick-up unit is not required to be near a communication device but can be placed at a more useful site. As one example, when a daughter device is located at the front door as an interphone connected to the home communication system, not only can preparation to receive a visitor be quickly conducted, but early discovery can be achieved of a suspicious person at the front door.

An auxiliary device for communication of a sixth aspect of the present invention is characterized in that, on one hand, a detecting unit for detecting at least one of a human body and a fire is equipped to a vessel connected to a external connecting terminal of a portable telephone provided with a speech and image transmitting function using commercial electromagnetic waves, while on the other hand, an auto-dialing instruction originating section for calling a specified telephone of the recipient based on a predetermined output signal from the detecting unit automatically while specifying the telephone equipped with a image display function of the recipient is equipped to a portable telephone or the vessel.

A sensor such as a human body detecting unit comprises at least one of a pyroelectricity type or a thermopile type infrared detector detecting, for example, infrared rays in the vicinity of 10 $\mu$m in wavelength, a supersonic wave type detector and a near infrared detector detecting near infrared rays in the vicinity of 1 $\mu$m in wavelength, and a sensor as a fire detecting unit comprises at least one of a pyroelectricity type or a thermopile type infrared flame detector detecting, for example, infrared rays in the vicinity of 4.3 $\mu$m in wavelength, a thermal detector, a smoke detector and a ultraviolet detector.

In a case where crime prevention, welfare and others are the objectives, an auxiliary device for communication equipped with a human body detecting unit can be made ready for use, in a case of fire prevention being an objective, an auxiliary device for communication equipped with a fire detecting unit is made ready for use and in a case of crime prevention, welfare and others, and fire prevention being objectives, two kinds of auxiliary devices for communication or an auxiliary device for communication equipped with a human body detector and a fire detector can also be used. Further, such auxiliary devices for communication are preferably placed at as many predetermined sites as possible in a building, a warehouse and other locations requiring monitoring.

On the other hand, a telephone with an image display function (which may be of either an installed type or a portable type, is preferably of a portable type when a recipient is frequently on the move outside the home or office and hereinafter referred to as a "telephone on the recipient side", for convenience) other than a portable telephone equipped with this auxiliary device for communication (hereinafter referred to as a "portable telephone on the sender side", for convenience) is made ready to use and based on a predetermined output signal from the detecting unit, the telephone on the recipient side as previously specified can be automatically called by an auto-dialing instruction originating section.

With the above described construction and arrangement, for example, in a case where a suspicious person intrudes into a warehouse or a like building, the intruder is detected by the human body detector when the intruder moves around in the vicinity of the human body detector of the auxiliary device for communication, while in a case where a fire breaks out, such a situation is detected by the fire detector, a predetermined output signal is issued from the detecting unit based on the detection and thereby, the telephone previously specified on the recipient side is automatically called by the auto-dialing instruction originating section.

Further, when plural kinds of human body detecting units with different detecting functions or plural kinds of fire detecting units with different detecting functions are provided, detecting accuracy increases, thereby realizing an advantage of higher reliability.

In brief, according to a sixth aspect of the present invention, since the telephone on the recipient side is equipped with an image display unit, it can be visually confirmed in a remote manner, with the help of an auxiliary device for communication equipped with the human body detecting unit, whether or not a calling information source of the portable telephone on the sender side is an intrusion of a suspicious person and in addition to this, other activities such as a call from a handicapped person, the presence of a visitor, movement of an elderly person, a rapid change in condition of a patient in bed, waking up of a baby or infant, a criminal in robbery or theft on a car, a burglar into the home, offenses of a wild animal and others that may occur and in an auxiliary device for communication equipped with the fire detecting unit, occurrence of a fire can be recognized visually and in a remote manner.

Especially, in a case where a portable telephone equipped with an auxiliary device for communication is further equipped with image display unit for displaying shot image information from a sender side in communication, the portable telephone can remotely communicate with the scene of occurrence of an abnormal situation using image and speech in an interactive manner. When an appropriate, plural number of auxiliary devices for communication with such a construction are made ready for use on each of the sender and recipient sides, a surveillance area, for example, can be expanded according to the number of rooms or the number of houses, to be surveyed, or a further reinforcement in cooperation in aspects of crime prevention, fire prevention, welfare and medical care and a surveillance system can be expected through a network of family members, relatives, friends, acquaintances, people in the close neighborhood and others.

BRIEF DESCRIPTION OF THE DRAWINGS

The exact nature of this invention, as well as its objects and advantages, will become readily apparent from consideration of the following specification as illustrated in the accompanying drawings, in which like reference numerals designate like parts throughout the figures thereof, and wherein.

DETAILED DESCRIPTION OF THE PREFERRED EMBODIMENT

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a compact and inexpensive surveillance system utilizing a plurality of portable telephones.

Figure 1:
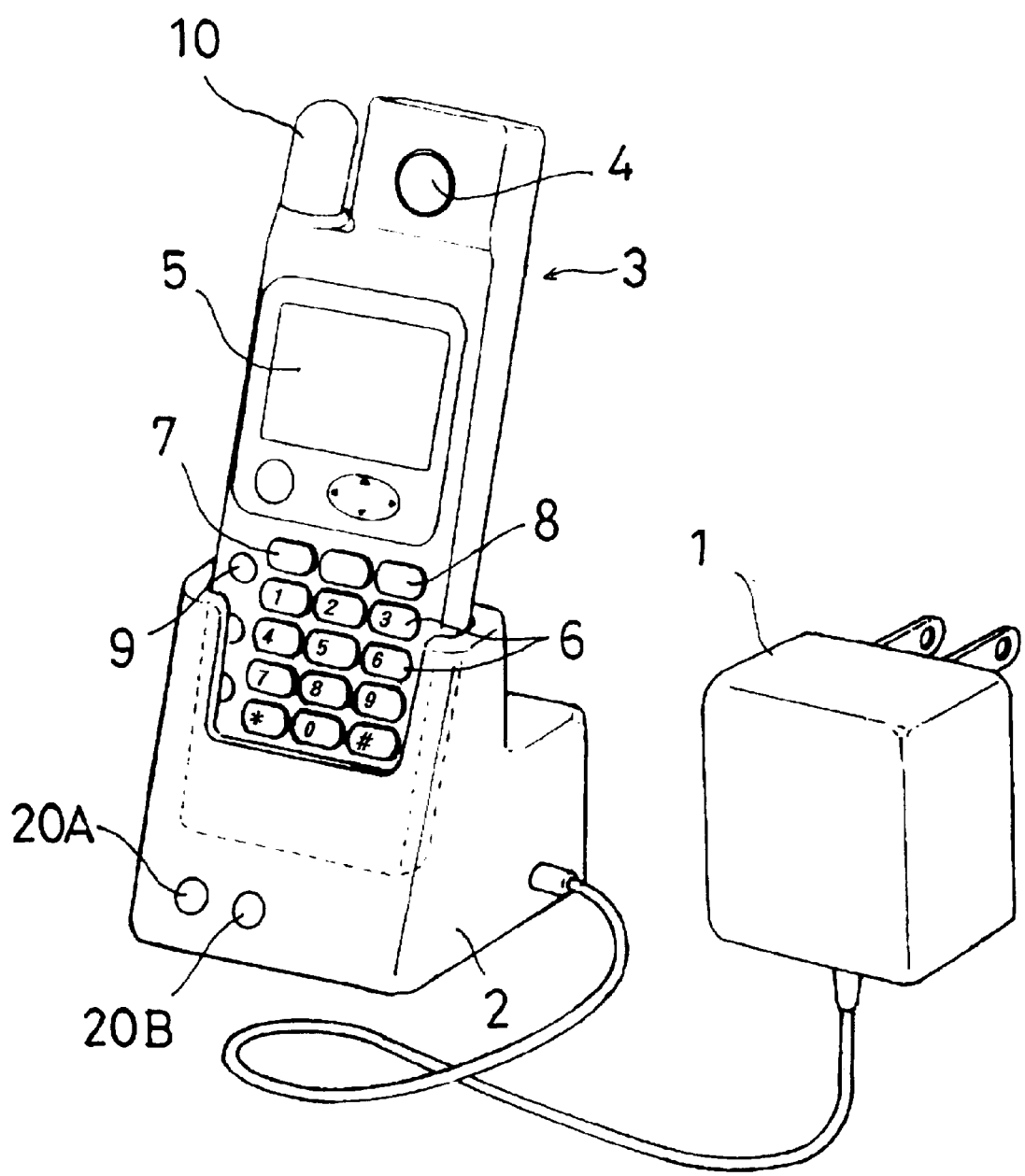
FIG. 1 is a perspective view of a communication device.

Description will be given of an embodiment of the first aspect of the present invention below with reference to accompanying drawings. FIG. 1 shows a communication device of one embodiment relating to a first aspect of the present invention and the communication device is constructed such that a portable telephone 3 is set in a charging holder 2 connected to an AC adapter (a stabilized power source) 1 assuming a charging posture.

Figure 2:
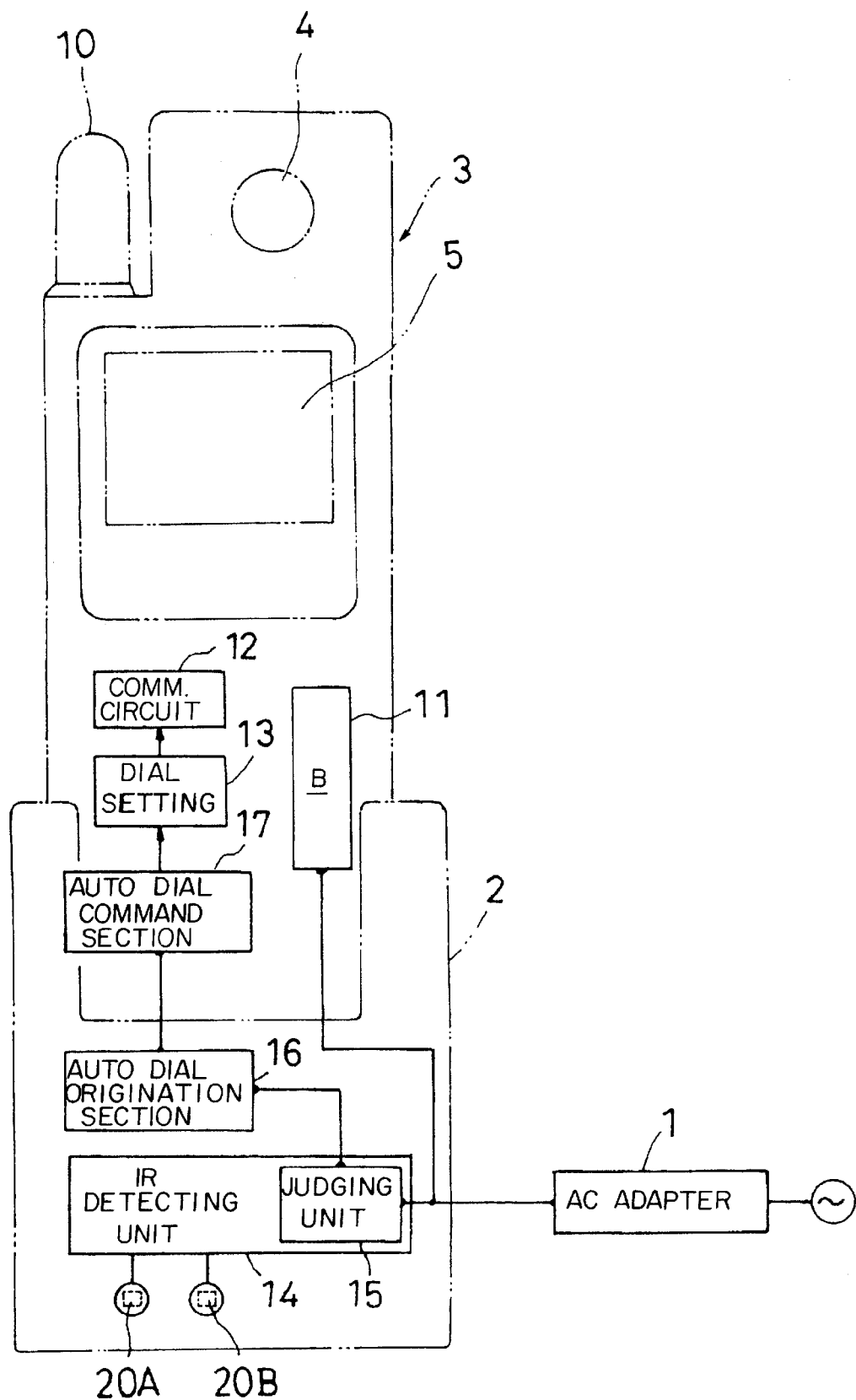
FIG. 2 is a block diagram of various functional sections included in a portable telephone.

The portable telephone 3 comprises an image pick-up unit 4 and an image display unit 5 and has a transmit/receive function for image and speech using commercial bandwidth electromagnetic waves (for example, a commercial wave used by NTT within Japan). The telephone 3 further comprises conventional dial buttons 6, execute/terminate buttons for conversation 7 and 8, a menu button 9 presenting contents of various functions (a list of directory numbers or abbreviated numbers of the recipients and so on) provided to the portable telephone 3 on the image display means 5, and an antenna 10 of a telescopic type. As shown in a block diagram of FIG. 2, the telephone 3 further comprises a battery, B, 11 electrically connected to the AC adapter 1 in a state when the portable telephone 3 is set in the holder 2, communication circuitry 12, and dialing setting unit 13 for calling a specified telephone on the recipient side as internal constituents.

On the other hand, the holder 2 is of a desk top type (alternately, it may be a wall-hung type, in which case the holder 2 is hung on a hook, etc.) and has infrared detecting unit 14 which detects infrared rays radiated around the front surface section of the holder 2, an abnormality judging unit 15 judging the occurrence of an abnormality based on a predetermined output signal from the infrared detecting unit 14 and an auto-dialing instruction originating section 16 calling at least one telephone number preset by the dialing setting unit 13 automatically, by entering an operation signal into the dial setting unit 13 based on the result of a judgment determination of an abnormality occurring.

Figure 3:
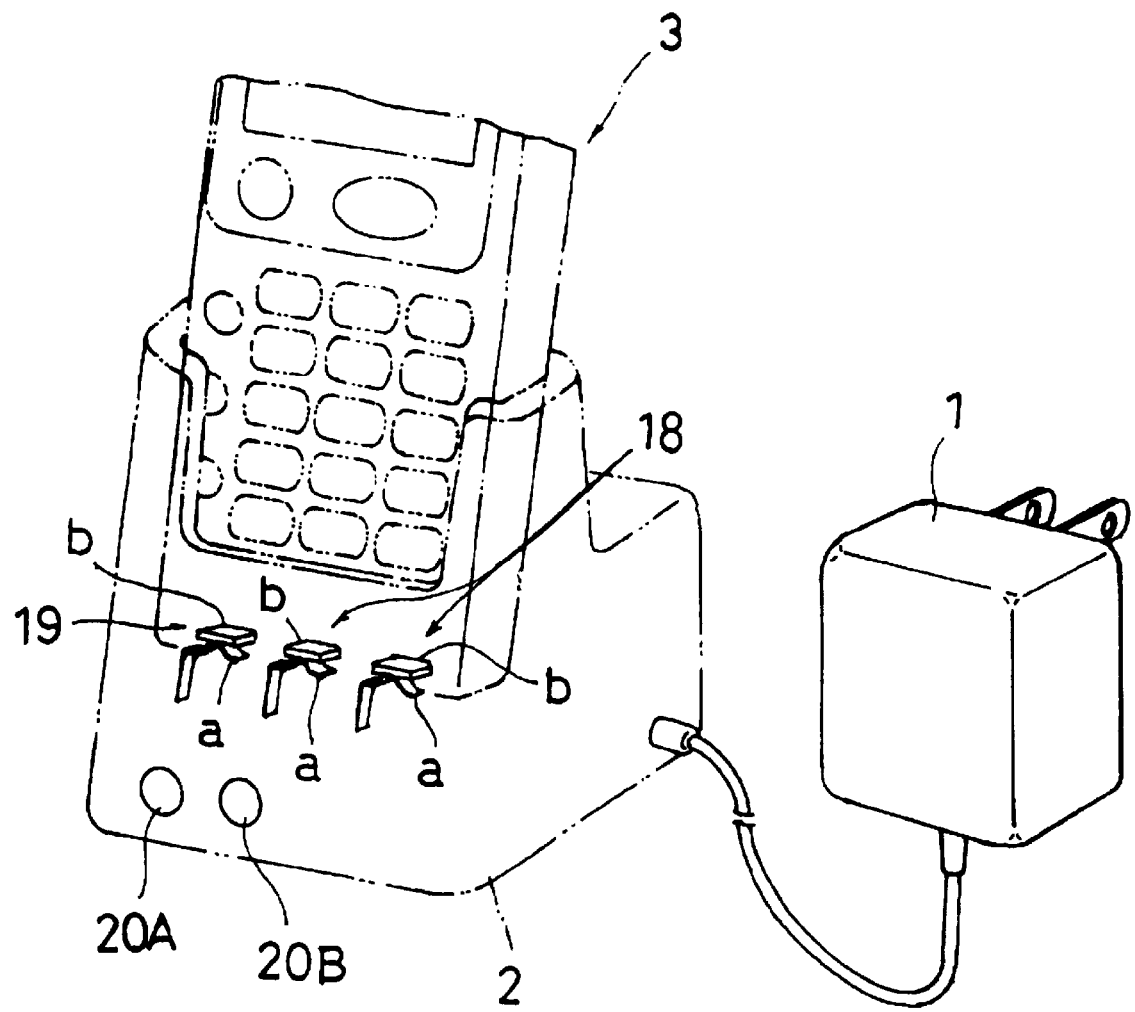
FIG. 3 is a perspective view showing configuration of a connecting circuit between a portable telephone and a holder.

Further, an auto-dialing instruction receiving section 17 on the side of the portable telephone 3 for entering a dial command into the dialing setting unit 13 and the auto-dialing instruction originating section 16 on the holder 2 side are constructed such that the sections 16 and 17 are put into an electrical connection state when the portable telephone 3 is set in the holder 2. That is, for example, as shown in FIG. 3, the connection between the portable telephone 3 and the holder 2 is effected by a circuit 19 similar to a battery connection circuit 18 in which an output terminal a of a leaf spring and an input terminal b is put into contact with each other.

Figure 4:
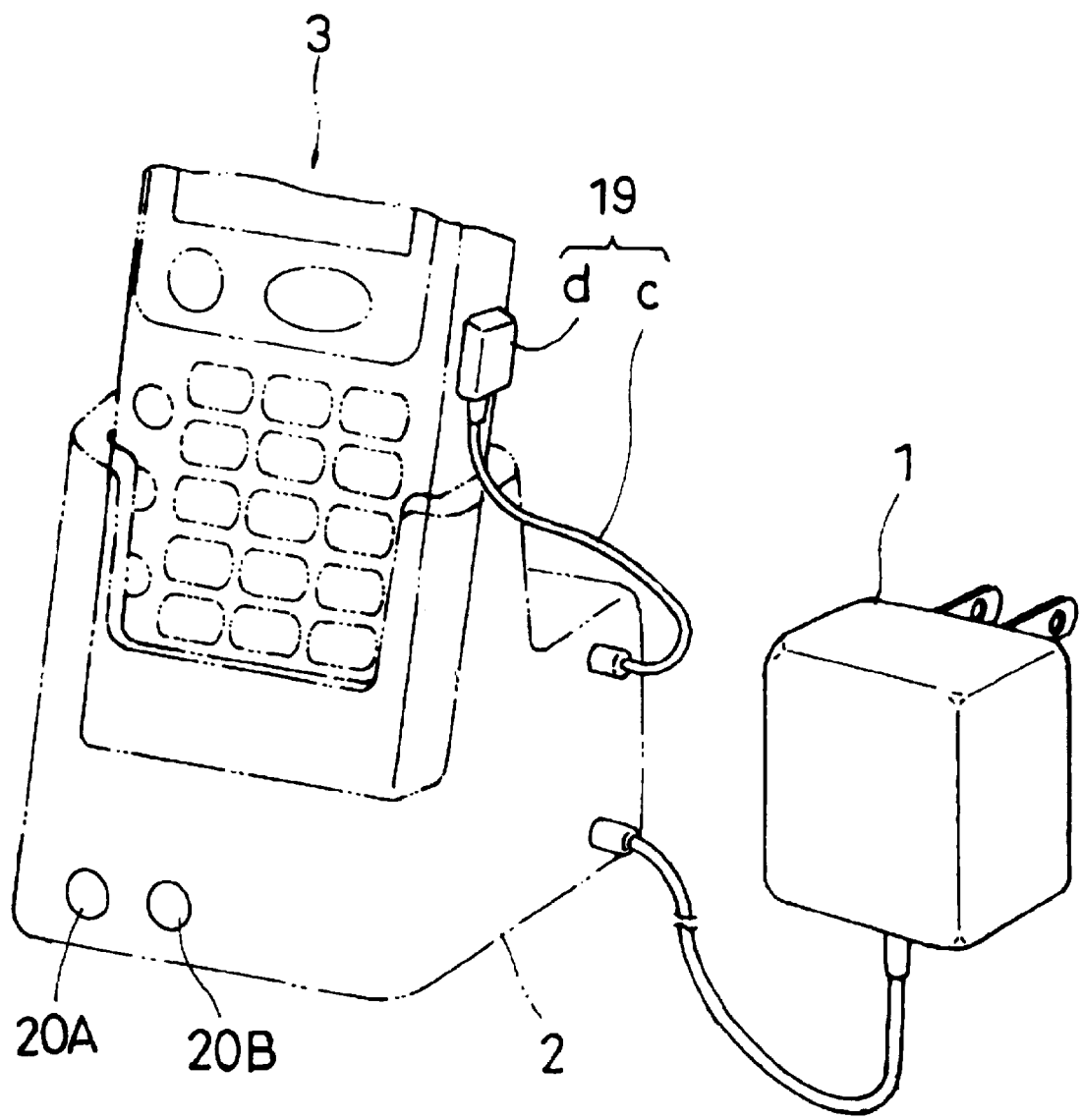
FIG. 4 is a perspective view showing configuration of the connecting circuit according to another embodiment.
Figure 5:
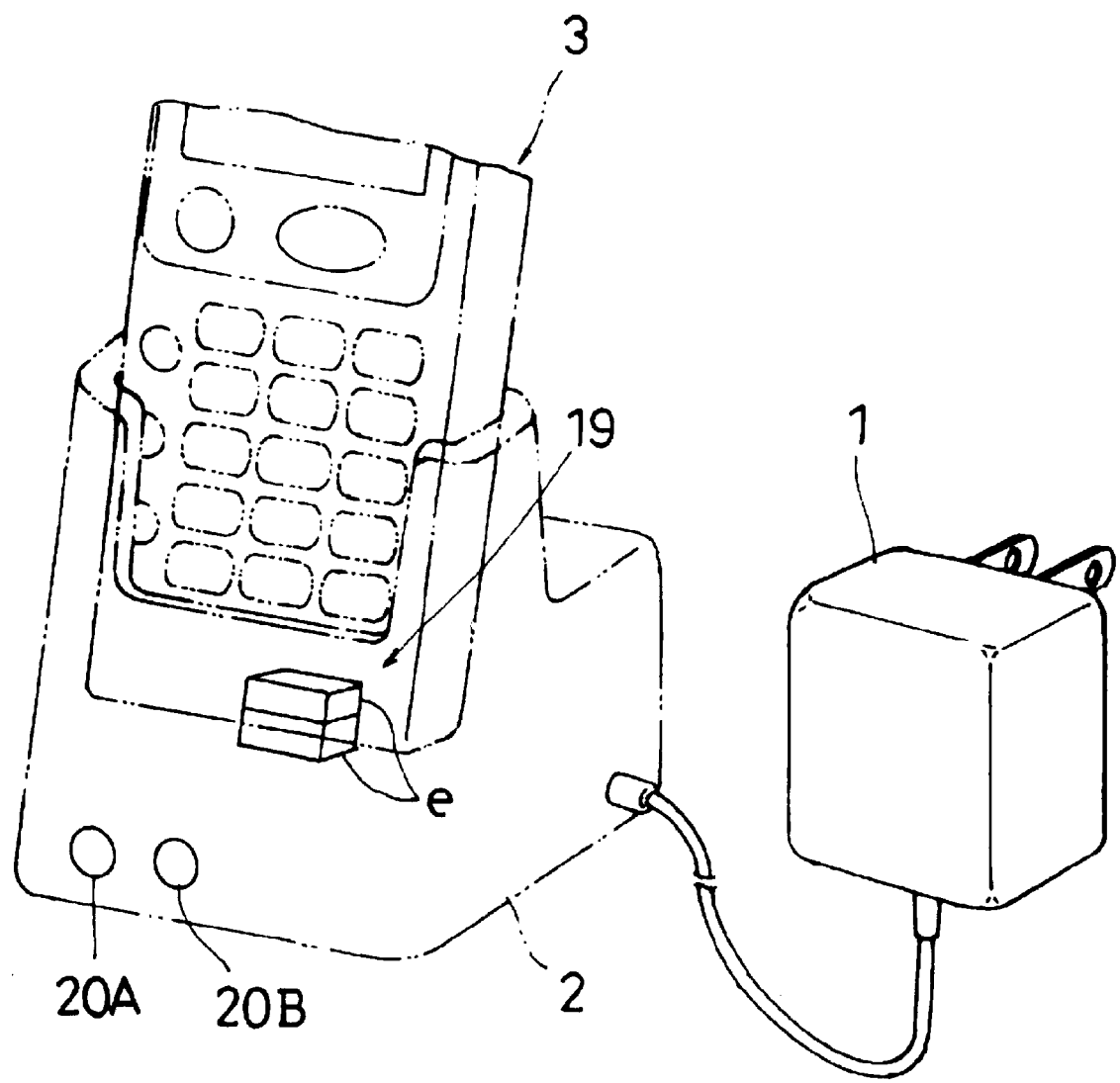
FIG. 5 is a perspective view showing configuration of the connecting circuit according to still another embodiment.
Figure 6:
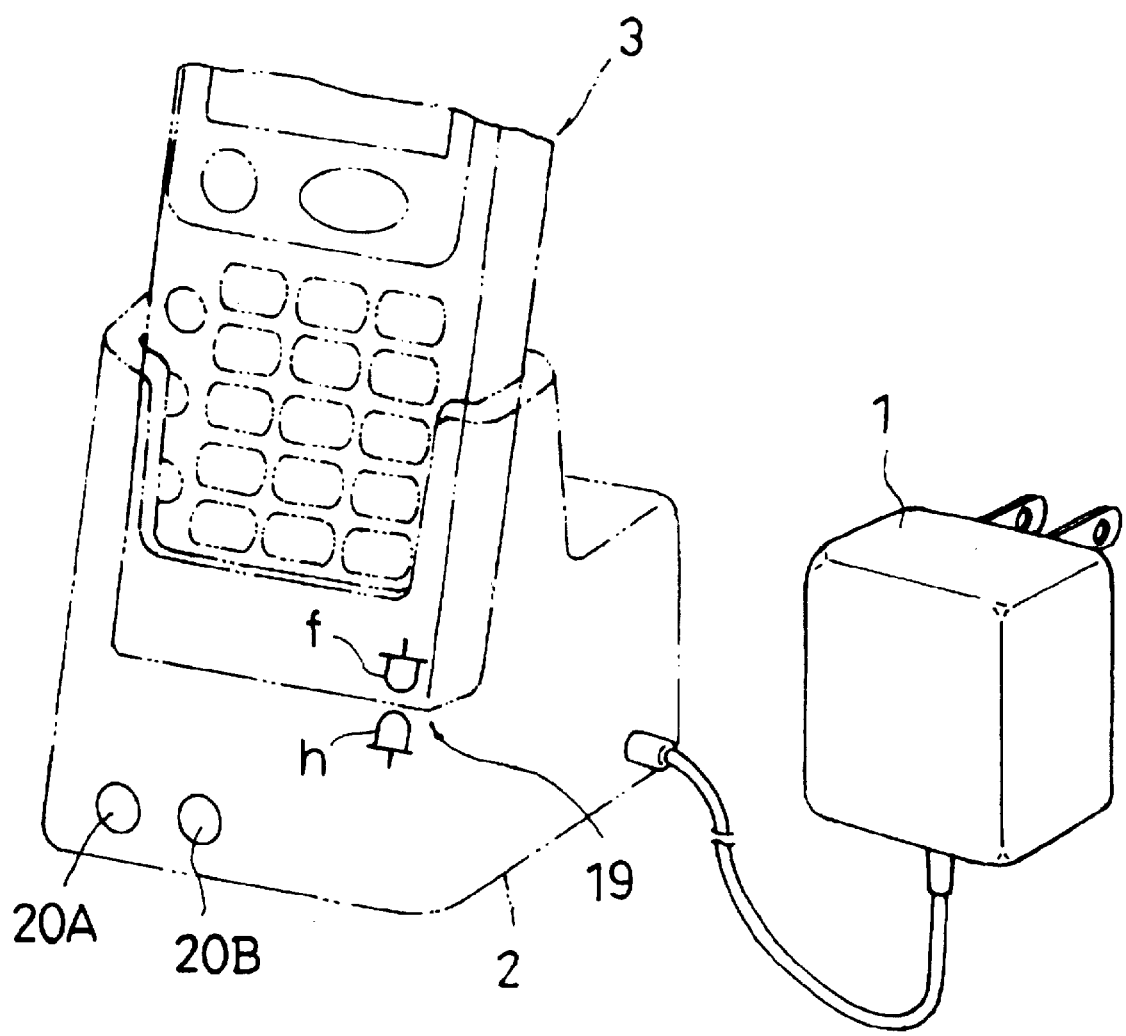
FIG. 6 is a perspective view showing configuration of the connecting circuit according to another embodiment using pulsed light.

It should be appreciated that the connection between the instruction originating/receiving sections 16 and 17 is not limited to the above described circuit configuration, since either of the modified embodiments such as a connecting circuit 19 including a lead line c and a plug d as shown in FIG. 4 and a connecting circuit 19 including female and male sockets e as shown in FIG. 5 can be selected. Alternatively, a communication circuit 19 using pulsed light including light receiving and emitting elements f and h can also be selected. The connecting and communication circuits can be used, singularly or in combination.

Figure 7:
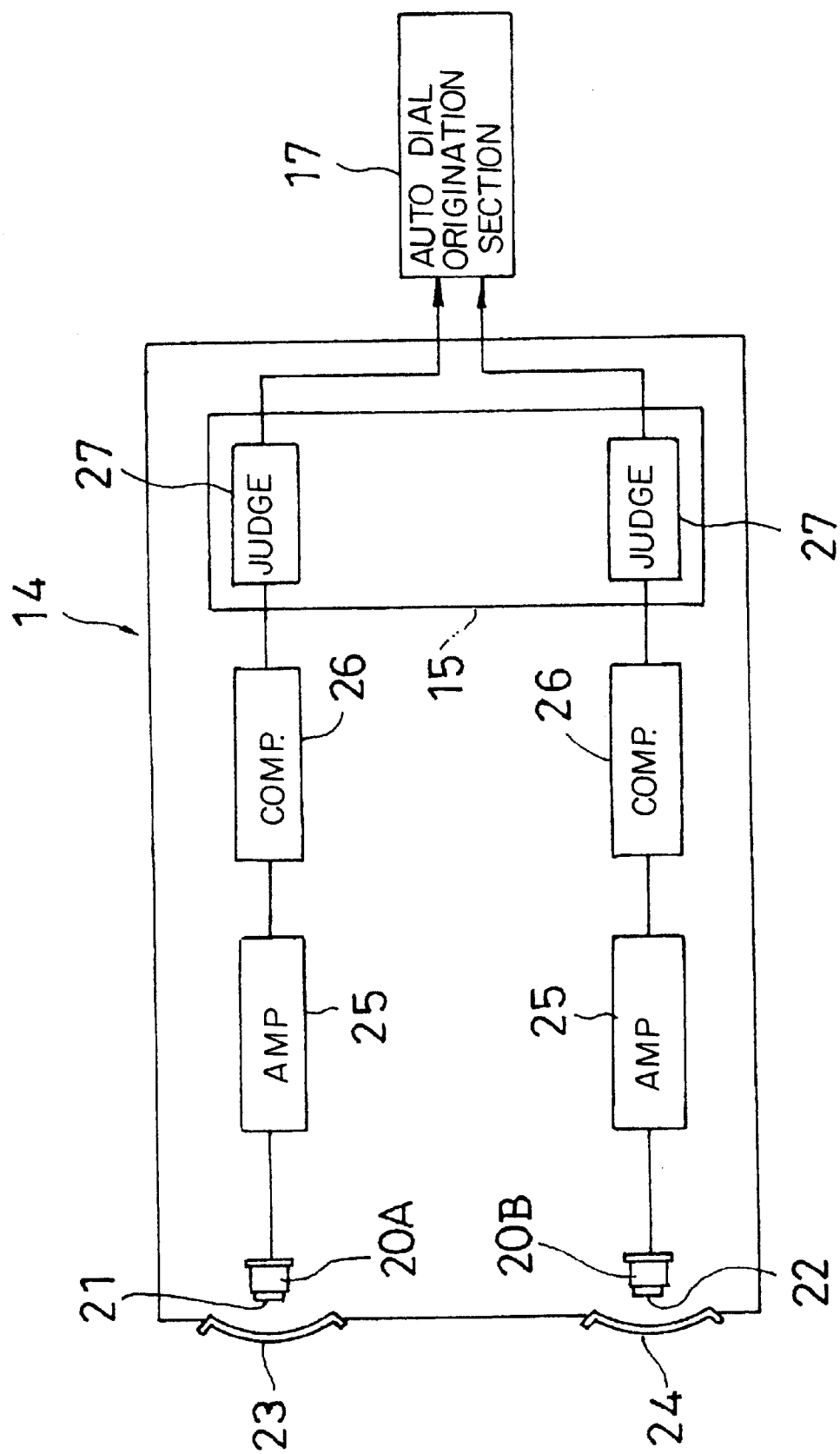
FIG. 7 is a block diagram of infrared detecting unit.

The above described infrared detecting unit 14, as shown in a block diagram of FIG. 7, is equipped with two infrared sensors 20A and 20 B constituted of detectors of a pyroelectricity type or a thermopile type. More particularly, the infrared detecting unit 14 comprises a sensor 20A for detecting a human body, equipped with a 10 $\mu$m band pass filter 21 so as to sense infrared rays in the vicinity of 10 $\mu$m in wavelength radiated from the human body and a sensor 20B for detecting a combustion flame, equipped with a 4.3 $\mu$m band pass filter 22 so as to sense infrared rays in the vicinity of 4.3 $\mu$m in wavelength radiated from the flame, wherein a collective lens 23 is placed at the front surface section of the sensor 20A and an infrared transmission cover 24 is placed at the front surface section of the sensor 20B.

To each of the sensors 20A and 20B, an amplifier 25, a comparator 26 and a judging section 27 are connected in series such that a dial command is output to the auto-dialing instruction originating section 16 from the abnormality judging unit 15 based on a predetermined output signal generated in response to detection either of a human body and a fire.

According to the communication device with the above construction, when a person intrudes into a predetermined detection area of infrared rays under surveillance by the infrared detecting unit 14, infrared rays radiated by the human body are caught by one infrared sensor 20A. Then, intrusion of the person into the infrared detection area is judged to be an abnormality by the abnormality judging unit 15 and the judgment result is entered into the auto-dialing instruction receiving section 17 from the auto-dialing instruction originating section 16 through the connecting circuit 19. With the inputting of the judgment result, the dialing setting unit 13 initiates a call to at least one preset telephone on the recipient side.

On the other hand, when a fire breaks out in the infrared detection area of the infrared detecting unit 14, infrared rays radiated from a flame are received by the other infrared sensor 20B. Then, the abnormality judging section 15 enters the judgment result of a fire occurrence into the auto-dialing instruction receiving section 17 from the auto-dialing instruction originating section 16 and thereby, the dialing setting unit 13 calls at least one preset telephone on the recipient side as well. At this time, one or more of specified other parties on the recipient side may selectively be called according to whether there is an intrusion of a person or the breaking out of a fire.

Therefore, a plurality of communication devices having the above construction can be placed at predetermined sites in, for example, a warehouse and so on, and portable telephones 3 are also provided to the communication devices which can be used as conventional portable telephones on the sender side, while separately from the arrangement of the communication devices on the sender side, a receiving telephone unit with a speech/image transmit/receive function is made ready for use on the recipient side. With such a construction and arrangement, if a directory number of the telephone on the recipient side is previously entered into the dialing setting unit 13 of a portable telephone on the sender side, the intrusion of a suspicious person into a warehouse can be caught by the infrared detecting unit 14 when the suspicious person, intruding into the warehouse, enters the infrared detection area of the infrared detecting unit 14, while a flame of a fire in the warehouse is detected by the infrared detecting unit 14 when the fire breaks out in the warehouse.

At this time, a predetermined output signal from the infrared detecting unit 14 is entered into the dialing setting unit 13 through the auto-dialing instruction originating section 16 and thereby, the dialing setting unit 13 calls a preset telephone on the recipient side automatically. When the telephone on the recipient side is switched over into a communication session based on the particular calling, a picture around the portable telephone 3 on the sender side (that is a picture of the intruder or the fire) is presented on the image display means of the telephone 3.

Figure 8:
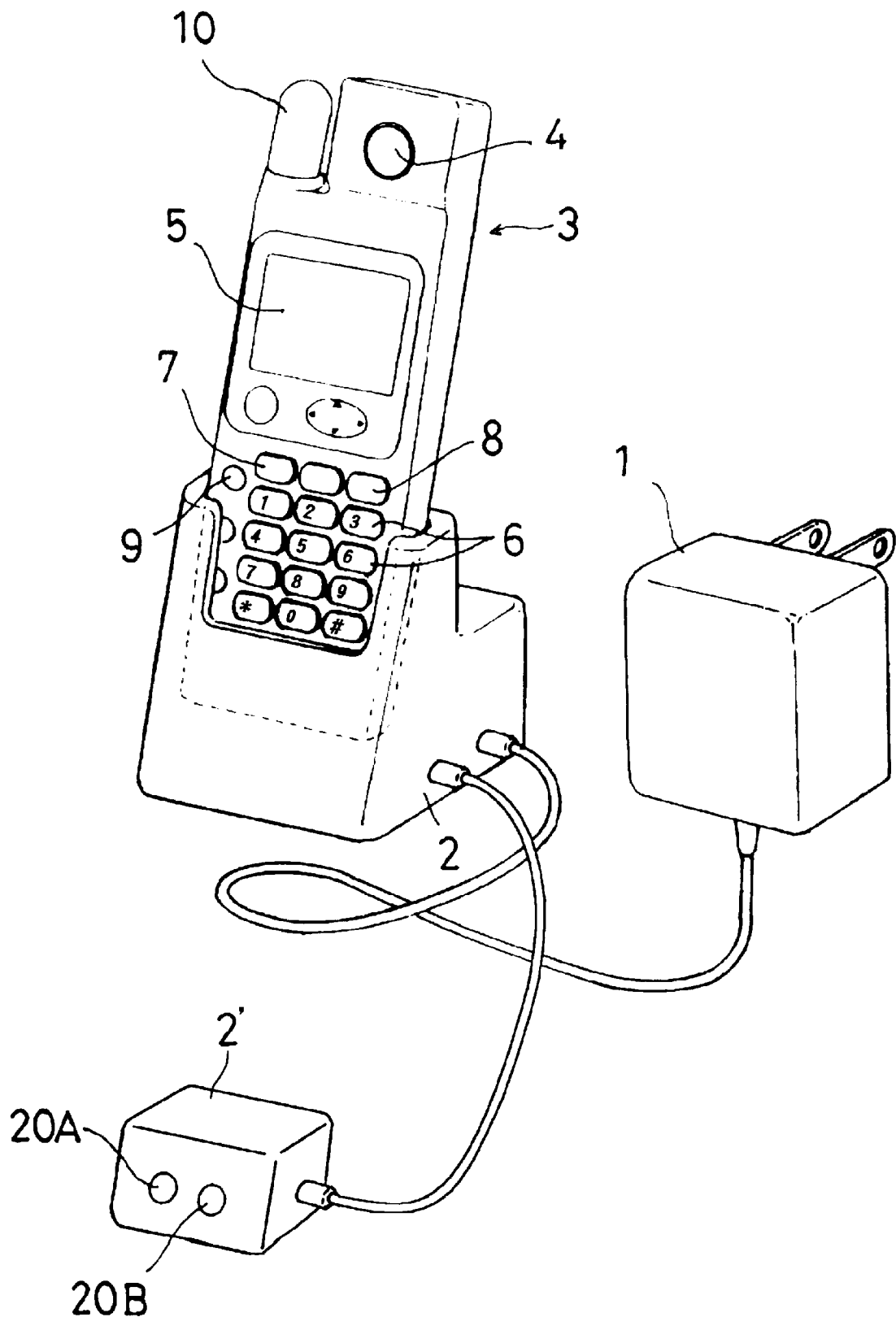
FIG. 8 is a perspective view of another example of the infrared detecting unit.

FIG. 8 is a perspective view showing a modification example of the infrared detecting unit 14. Sensors 20A and 20B constituting part of the infrared detecting unit 14 in FIG. 8 are provided in a vessel 21 which is connected to the holder 2 by means of hard-wired communication or wireless communication. With such a construction as in this example, the sensors 20A and 20B can be placed in a remotely spaced manner from the holder 2, thereby enabling placement of the sensors 20A and 20B at not conspicuous sites which ensure the system performances.

An image buffer for storing image information separately at a recorded timing at which the detection energy of infrared rays by the infrared sensor 20A changes is also provided in the portable telephone 3, in the holder 2 or in the vessel 2' connected to the holder 2. With such a provision of the image buffer, a situation can be avoided in which an initial status of the abnormality may become impossible to confirm due to a time loss till communication with the portable telephone on the recipient side becomes established from a time when an output signal from the infrared detecting unit 14 is received on the recipient side.

Furthermore, when a telephone on the recipient side is portable, a recipient, wherever he or she is located, can instantly recognize by a visual indicator or an auditory indicator in a remote manner occurrence of the above described situations and further whether the calling by an automatic dialing is caused by detection of a human body or a fire. Based on such information, rescue can selectively be requested from a police department, a fire department, or acquaintances in the close neighborhood with a appropriate result using the portable telephone on the recipient side, so that an early measure against crime prevention and fire prevention can be established. In this situation, since malfunctioning of the infrared sensors 20A and 20B or even false information caused by intrusion of small animals such as a pet can be confirmed by using a picture of the scene, fruitless response efforts such as immediate dispatch to the scene otherwise caused by false information can also be avoided.

When communication devices with the above described construction are placed around a patient in bed, around a baby or infant in a crib and in addition to these, at an exit/entrance position such as the front door, movements of the patient in the bed, of the baby or infant, or a person when passing the exit/entrance are caught by the infrared detecting unit 14 and a telephone on the recipient side is automatically called, so that for example, loitering and abnormal behaviors of an elderly person, a rapid change in condition of a patient in bed, waking up of a baby or infant or others can instantly be recognized in a visual and remote manner.

With communication devices having the above described construction and arrangement, a portable telephone 3 equipped to such a communication device can remotely communicate with a telephone on the recipient side using image and speech in an interactive manner. Therefore, when a appropriate, plural number of communication devices with the above described construction are preferably provided ready to use on each of the sender and recipient sides, a surveillance area, for example, can be expanded according to the number of rooms or the number of houses, to be surveyed, or a further reinforcement in cooperation in aspects of crime prevention, fire prevention and so on and a surveillance system can be created through a network of family members, relatives, friends, acquaintances, people in the close neighborhood and others.

Still in addition to the above cases, in those cases where communication devices with the above construction and arrangement are placed on an auto-bicycle or at appropriate places in the cabin of a car or the like, visual detection of a criminal and notification thereof, when robbery or theft occurs on an auto-bicycle or a car, can be effected by a telephone on the recipient side and in this case, when an image recording device is externally connected to the telephone on the recipient side and picked-up image information from the portable telephone on the sender side is recorded, the recorded images can be a clue for specifying the criminal. Furthermore, in the field of agriculture, when communication devices with the above configuration are placed, for example, at predetermined sites in a vinyl greenhouse, offenses by wild animals therein can visually be detected with the help of information on the kinds of animals.

It should be appreciated that while in the above described embodiment, the image display unit 5 is equipped to the portable telephone 3 in a communication device on the sender side, the embodiment can satisfactorily be carried out without the image display unit 5 on the sender side in the cases of crime prevention and fire prevention since image information from the telephone on the recipient side is not necessary to be displayed on the portable telephone 3 on the sender side.

Further, when a communication device on the sender side is set to surveillance states for crime and fire prevention and others, the infrared detecting unit could detect an authorized person herself or himself and regard the authorized person as an intruder by mistake and wrongly call a specified telephone on the recipient side, as a preventive measure against such inconveniences, a timer (dead time) for several seconds is preferably set after a surveillance state is armed, that is the surveillance state is preferably set by a command from, for example, a telephone on the recipient side. This command may arbitrarily be transmitted to the auto-dialing instruction originating section 16, the auto-dialing instruction receiving section 17 or the like sections.

Alternatively, while the battery 11 for the portable telephone 3 is charged in cases other than a surveillance mode such as a crime prevention or fire prevention, a specified telephone could also be called by detection of a person that is effected by the infrared detecting unit 14. As a preventive measure against occurrence of this situation, for example, a change-over switch between a surveillance mode and a charge mode may be provided in the infrared detection system, and a timer (dead time) for several seconds is set after the charge mode is changed over to the surveillance mode, whereby human body detection by the infrared sensor 20A is disabled in the charge mode.

Figure 9:
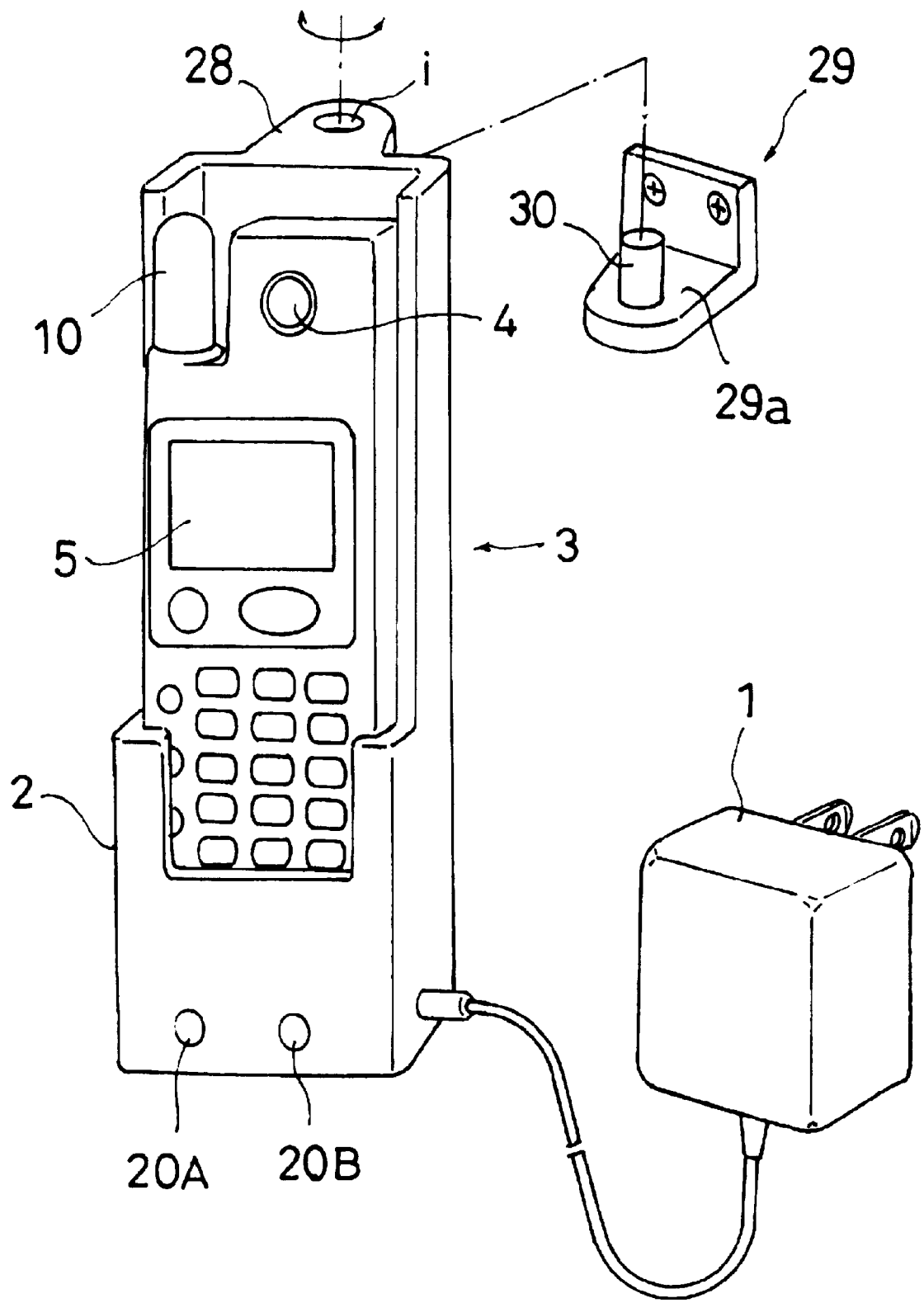
FIG. 9 is a perspective view of a communication device according to another embodiment.

Description will now be given of a communication device according to another embodiment with reference to FIG. 9. This embodiment is characterized in that a communication device is constructed as a wall-hung type. A horizontal bracket member 28 is formed on the top side of the holder 2. An insert hole i formed in the bracket member 28, and a hook 30 is provided on a horizontal portion 29a of an angle member 29. The angle member 29 is mounted on a wall surface (not shown) to hang the bracket member 28 on the hook 30, so that an effective aiming range of the image pick-up unit 4 equipped to the holder 2 that is, to the portable telephone 3 can be adjustable by rotation around the supporting hook 30.

Furthermore, description will be made of a communication device according to still another embodiment with reference to FIG. 10. In this embodiment, not only is an image pick-up unit 4 of a portable telephone 3 constructed so as to enable head oscillation in a direction, forward or backward, but the holder 2 is constructed so as to be of a desktop type, which will be described below.

That is, the holder 2 is constructed of a support base or plate member 31 and a pivotal holder body 32 coupled with one end of the plate member 31 through a hinge structure 32a on a lateral axis, wherein not only is a support link 33 in which a engage groove j formed in a branched manner is pivotally fixed on the plate member 31, but a pin m selectively engaging in the engage groove j is provided to the holder body 32, so that a shooting range of the image pick-up unit 4 can be adjusted about the lateral axis.

Figure 11:
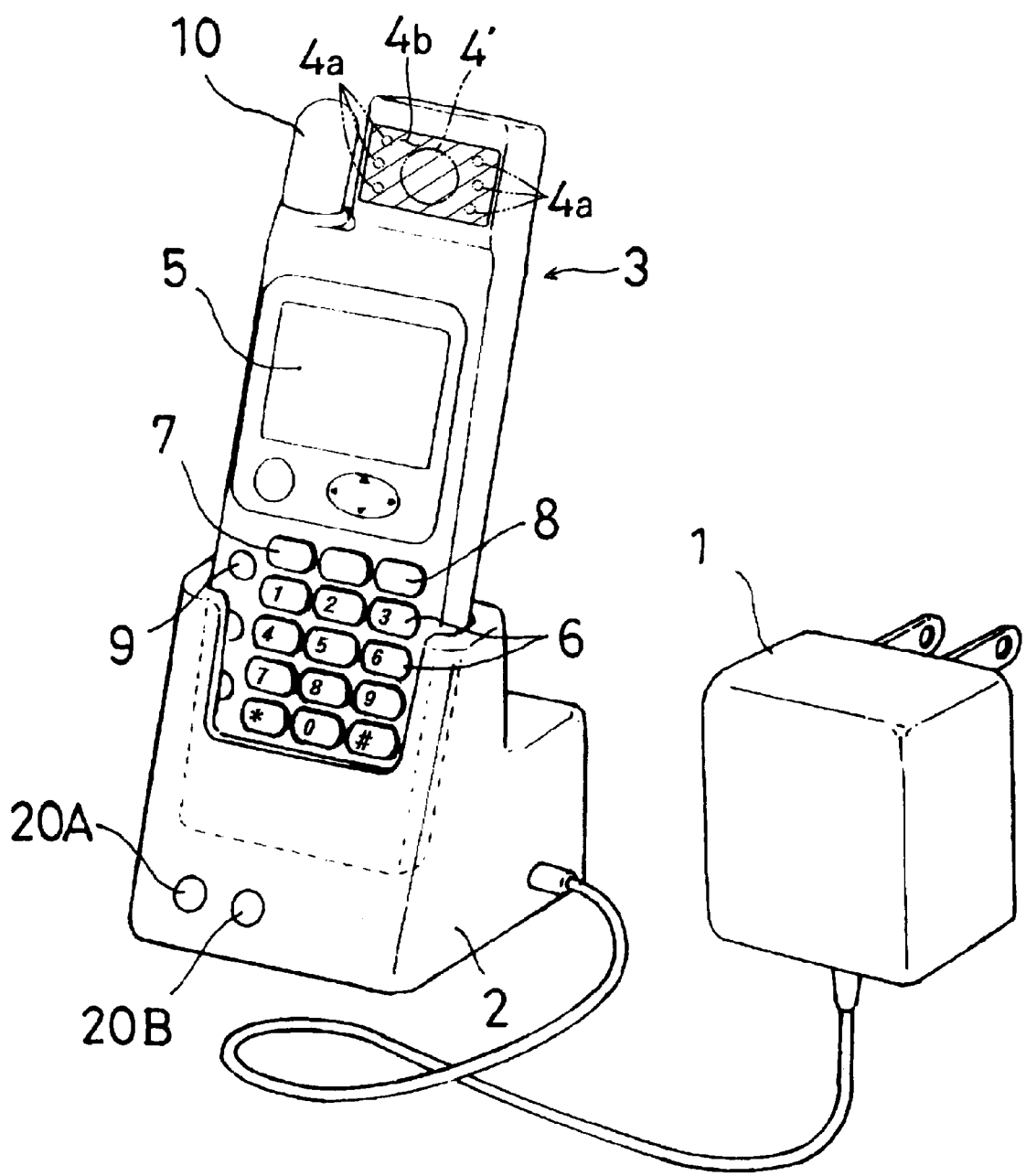
FIG. 11 is a perspective view of a communication device according to a further embodiment.

FIG. 11 is a view showing a further embodiment of image pick-up unit. The imaging unit 4' shown in this example is a camera picking-up a picture including wavelengths of the near infrared rays and this camera 4' is, for example, a camera with which a picture including wavelengths of near infrared rays (for example, in the s range of from 0.7 $\mu$m to 1.5 $\mu$m) is shot. An alphanumerical mark 4a indicates a light emitting diode as an example of a near infrared light source for illuminating the target area and an alphanumerical mark 4b indicates a transmission window behind which the light emitting diode 4a and the camera 41 are positioned in the portable telephone 3.

In this example, since shooting by the camera 4' is conducted such that wavelengths used in the shooting include the above described near infrared rays, a picture shot by the camera 4' can provide an image close to a visible image as viewed with the naked eye even in the dark, thereby making the picture suitable for identifying a person to be surveyed. Near infrared light rays radiated from the light source 4a are not conspicuous since the light rays cannot be seen directly by the naked eye and a person under surveillance is not conscious of the presence of the camera 4' owing to light rays from the light source 4a, which is advantageous from the viewpoint of crime prevention.

In addition, with the transmission window 4b provided as in this example, the camera can be further less conspicuous. It should be appreciated that the present invention is not limited to the use of rays ranging from visible light rays to near infrared rays. That is, infrared light rays in an intermediate range (of 1.5 $\mu$m to 5 $\mu$m in wavelength) and far infrared light rays (of 5 $\mu$m to 100 $\mu$m in wavelength) may be used for the shooting. Further, the present invention is not limited to shooting an intensity distribution of infrared light rays as an infrared ray image, but could shoot a wavelength distribution of infrared light rays as an infrared ray image.

In a case where wavelengths of light rays used in shooting are those of the infrared rays in the intermediate range and the far infrared rays, a light source such as the light emitting diode 4a is omitted and the infrared light rays radiated from a human body can be picked up as a target image, as they are. That is, a person under surveillance cannot find out the camera 4' using the light source 4a as a clue.

Figure 12:
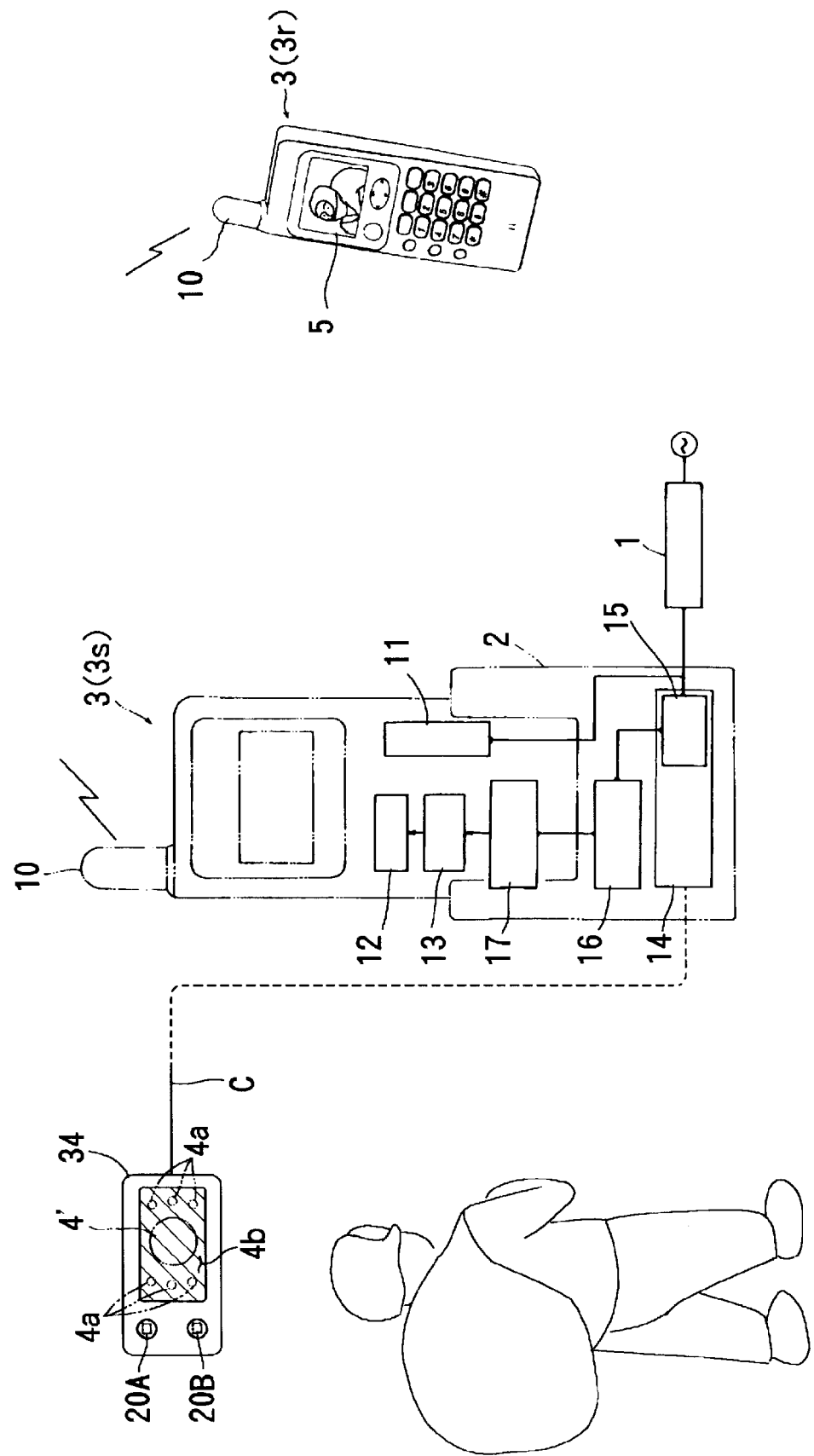
FIG. 12 is a perspective view of a communication device according to a still further embodiment.

FIG. 12 is a view showing a still further embodiment of the first aspect of the present invention shown in FIG. 1. In this example, a surveillance camera 34 is provided separately from the holder 2 of a portable telephone equipped with an image transmission function. The surveillance camera 34 comprises the image pick-up unit 4', a light source 4a thereof, and infrared sensors 20A and 20B. The surveillance camera 34 can communicate with the holder 2, for example, through a communication cable C and is placed at a site not conspicuous but desirable for surveillance. On the other hand, the holder 2 and the portable telephone 3 are placed at sites under good electromagnetic wave conditions but cannot be seen from a location of a surveillance objective.

With the above described construction and arrangement, a person under surveillance is harder to find out a communication device of the present invention and thereby, performance as a crime preventive device can be improved.

It should be appreciated that in this example as well, light rays used by the image pick-up unit 4' loaded on the surveillance camera 34 is not limited to only light rays ranging from the visible light rays to the near infrared light rays, but far infrared light rays and infrared light rays in the intermediate range may also be used. In cases where the latter infrared rays are used, it is unnecessary to use a light source 4a as detailed above.

Furthermore, while in this example, the surveillance camera 34 and the image pick-up unit are connected by the communication cable C, the present invention is not limited to the communication cable C as connecting means, but may be connected by way of cordless communication such as electromagnetic waves or optical communication. In addition, in this example, the surveillance camera 34 is equipped with the infrared sensors 20A and 20B, so that imaging can get started when a person under surveillance comes close to the surveillance camera 34 or a still image can be stored in an image buffer not shown, but the present invention is not limited to mounting positions of the infrared sensors 20A and 20B inside the surveillance camera 34.

Further, in this example, the image display section 5 is not provided to the portable telephone 3s on the sender side but an image data is transmitted using a portable telephone having a communication port, whereby the portable telephone can be used as a portable telephone equipped with an image transmission function. Besides, the portable telephone 3r on the recipient side is not equipped with image pick-up units 4 and 4'. That is, in order to implement the present invention, there is neither a need to equip the image display section 5 to the portable telephone 3s on the sender side, nor a need to equip the image pick-up unit 4 to the portable telephone 3r on the recipient side either. Therefore, it goes without saying that in any of the examples detailed using FIGS. 1 to 11 as well, the image display section 5 is not required in the portable telephone 3 loaded in the holder 2.

Figure 10:
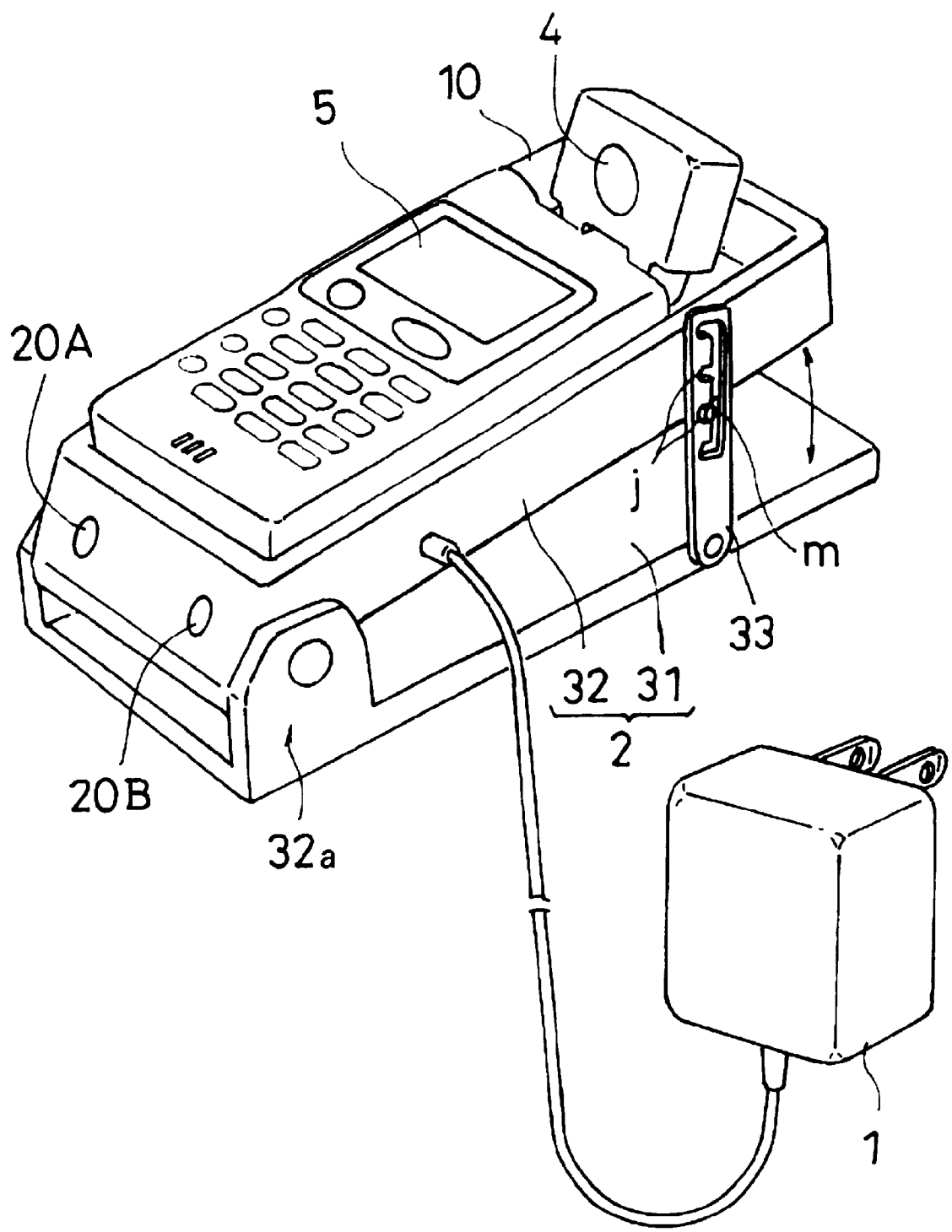
FIG. 10 is a perspective view of a communication device according to still another embodiment.

It should be appreciated that while in any of the above described embodiments, the auto-dialing instruction originating section 16 originating an auto-dial command is loaded on the holder 2, the auto-dialing instruction originating section 16 can be included in the portable telephone 3 side and further, needless to say that in any of the communication devices shown in FIGS. 1 to 9, 11 and 12, the portable telephone 3 can all be the portable telephone 3 of a head oscillating type shown in FIG. 10.

Further, while the holder 2 for charge is integrally used for a communication device, a holder for use in resting the portable telephone 3 in an inclined manner on the desk, for example, can be used or alternately, a dedicated holder may be provided separately.

In the present invention, as described above, a portable telephone equipped with a speech and image transmission function using commercial electromagnetic waves is employed to construct a communication device enabling monitoring occurrence of an abnormality and therefore, a so-called security system can be constructed at a low cost without requiring significant installation wiring work on a large scale.

Furthermore, since a portable telephone is used, not only can surveillance sites be changed with great ease, but interactive communication using speech and an image can be conducted and further, a portable telephone can satisfactorily be used in a normal mode as well. As a whole, according to the present invention, communication devices enable remote surveillance on an intruder and/or an occurrence of a fire to protect a property by individuals, singularly or in a small number as a unit without relying on a security company or a helper and further enables remote safety confirmation of human life precisely in real time at a low cost.

Further, in a case where the picture is of infrared rays, there arises no need to provide a conspicuous light source for shooting an image, thereby enabling sites for placement of a communication devices functioning as a crime preventive device, not to be conspicuous.

Figure 13:
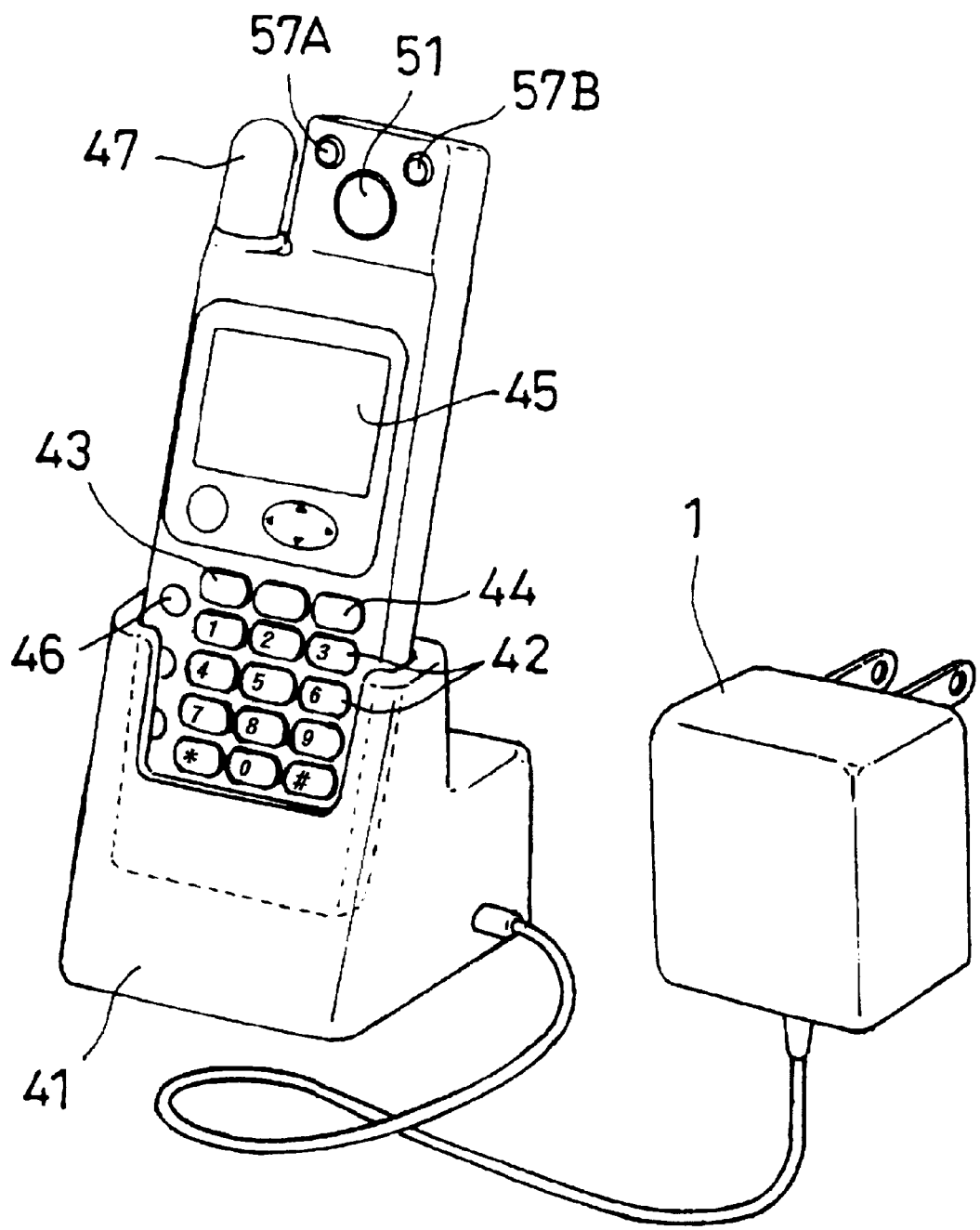
FIG. 13 is a perspective view of a portable telephone set in a charger.

Description will now be given of an embodiment of a second aspect of the present invention below with reference to accompanying drawings. FIG. 13 shows a perspective view of a portable telephone set in a charger 41 connectable to an AC/DC converter 1 and this portable telephone has a conversation function on commercial electromagnetic waves and comprises dial buttons 42, execute/terminate buttons for conversation 43 and 44, a menu button 46 presenting contents of various functions (a list of directory numbers or abbreviated numbers of the recipients and so on) provided to the portable telephone on an image display unit 45, and an antenna 47 of a telescopic type and in addition to these, as shown in a block diagram of FIG. 14, further comprises a portable telephone function section 48, a battery 49 and a speech processing section 50 as internal constituents.

While the above described construction is nothing more than a portable telephone generally widespread as a communication device, a communication device of the present invention is constructed such that the device comprises an image pickup unit 51 for shooting around the front surface section of the portable telephone, a transmitting unit 52 for transmitting shot image information to the recipient side in communication, an image display unit 53 for presenting shot image information (a picture) from the sender side in communication on the image display section 45, infrared detecting unit 54 for detecting infrared rays radiated around the front surface section of the portable telephone, dialing setting unit 55 for calling a preset telephone with an image display function on the recipient side in communication and an auto-dialing function section 56, wherein an operating signal is entered into the dialing setting unit 55 from the auto dialing function section 56 based on a predetermined output signal from the infrared detecting unit 54 and then at least one preset telephone with an image display function is automatically called by the dialing setting unit 55.

The above described infrared detecting unit 54 is provided with two infrared sensors 57A and 57B each constituted of a pyroelectricity type or a thermopile type detector, and the system is constructed such that an amplifier 58, a comparator 59 and a judging section 60 are connected to each of the sensors 57A and 57B, wherein a judgment result from the judging section 60 is entered into the auto-dialing function section 56, and one infrared sensor 57A is provided with a 10 μm band pass filter 61 so that infrared rays in the vicinity of 10 μm in wavelength radiated from a human body is sensed, and a collective lens 62 is placed at the front surface section.

The other infrared sensor 57B is provided with a 4.3 μm band pass filter 63 so that infrared rays in the vicinity of 4.3 um in wavelength radiated from a flame is sensed and an infrared transmission cover 64 is placed at the front surface section.

According to the above described construction, infrared rays radiated from a person in an infrared detection area under influence of the infrared detecting unit 54 are caught by the one infrared sensor 57A when she or he intrudes into the infrared detection area. Then, a judgment result of intrusion by a person into the infrared detection area is entered into the auto-dialing function section 56 through the judging section 60 to operate the dialing setting unit 55 and thereby, the portable telephone function section 48 calls at least one preset telephone with an image display function on the recipient side in communication.

On the other hand, when a fire breaks out in the infrared detection area under influence of the infrared detecting unit 54, not only is infrared rays radiated from a lame thereof caught by the other infrared sensor 57B but a judgment result of fire breaking out is entered into the auto-dialing function section 56 by the judging section 60 to operate the dialing setting unit 55, so that the portable telephone function section 48 this time as well calls at least one preset telephone with an image display function on the recipient side in communication. At this time, one of specified recipients to be called may be selected according to whether a person intrudes or a fire breaks out.

Therefore, when not only are a plurality of portable telephones with the above described construction as portable telephones on the sender side placed at distributing predetermined sites in, for example, in a warehouse and other buildings, but a telephone with the above described construction is separately made ready for use as a telephone on the recipient side and further, a directory number of the telephone on the recipient side is entered into the dialing setting unit 55 of the portable telephone on the sender side, then when a suspicious person is caught by the infrared detecting unit 54 when the suspicious person intrudes into the infrared detection area under surveillance by the infrared detecting unit 54 in a warehouse while a flame in the warehouse can also be detected by the infrared detecting unit 54 when a fire breaks out in the warehouse.

In such situations, a predetermined output signal from the infrared detecting unit 54 is entered into the dialing setting unit 55 through the auto-dialing function section 56 and the dialing setting unit 55, in turn, calls a preset telephone on the recipient side automatically. When the telephone on the recipient side is switched over to a communication session based on the calling, a picture around the portable telephone on the sender side (that is a picture of an intruder or a fire) is displayed on the image display section 45 of the portable telephone based on information from the image display unit 53.

Figure 16:
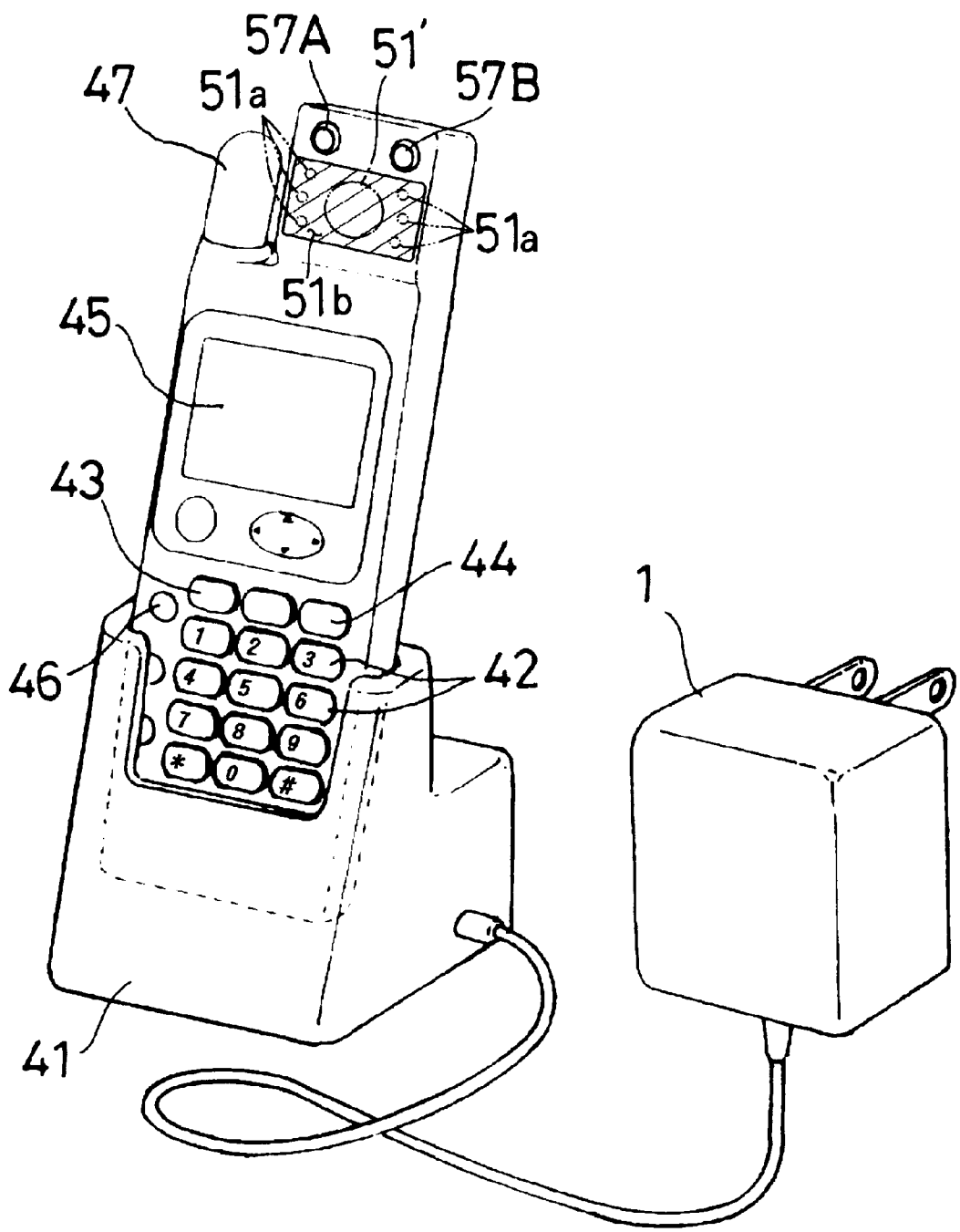
FIG. 16 is a perspective view of a modification of image pick-up unit.

FIG. 16 is a view showing a further embodiment of imaging unit. Image pickup unit 51' shown in this example is a camera shooting a picture including wavelengths of near infrared rays and this camera 51' picks up a picture of wavelengths including near infrared rays (for example, in the range of from 0.7 μm to 1.5 μm) as one example. Further, an alphanumerical mark 51a indicates a light emitting diode as one example of a near infrared light source and an alphanumerical mark 51b indicates a transmission window which covers the light emitting diode 51a and the camera 51' inside the portable telephone 3.

In this example, since wavelengths that the camera 51' uses for imaging includes the above described near infrared rays, a picture picked up even in the dark by the camera 51' can be close to a visible image seen by the naked eye and therefore, the shooting with wavelengths including the above near infrared rays is suitable for identifying a person under surveillance. Since near infrared rays radiated from the light source 4a cannot be seen directly by the naked eye, the rays are not conspicuous and a person under surveillance cannot be conscious of the presence of the camera 51' though being exposed to the rays from the light source 51a, which is advantageous in crime prevention.

In addition, when the transmission window 51b is provided as in this example, the camera 51' can be harder to be seen by the naked eye. It should be appreciated that wavelengths of light that the camera 51' uses for shooting are not limited in the range of from a visible light range to near infrared rays. That is, infrared rays in the intermediate range (of 1.5 μm to 5 μm in wavelength) and far infrared rays (of 5 μm to 100 μm in wavelength) may be used for shooting. Further, in the present invention, there is no limitation to shooting an intensity distribution of infrared rays as a picture, but the shooting may be of a wavelength distribution of infrared light rays as an infrared ray image.

In a case where wavelengths of rays used in shooting an image are infrared rays in the intermediate range and the far infrared rays, a light source such as the light emitting diode 51a is omitted and the infrared rays radiated from a human body can be picked up as a shot image. That is, a person under surveillance is unlikely to discover the camera 51' using the light source 51a.

Figure 17:
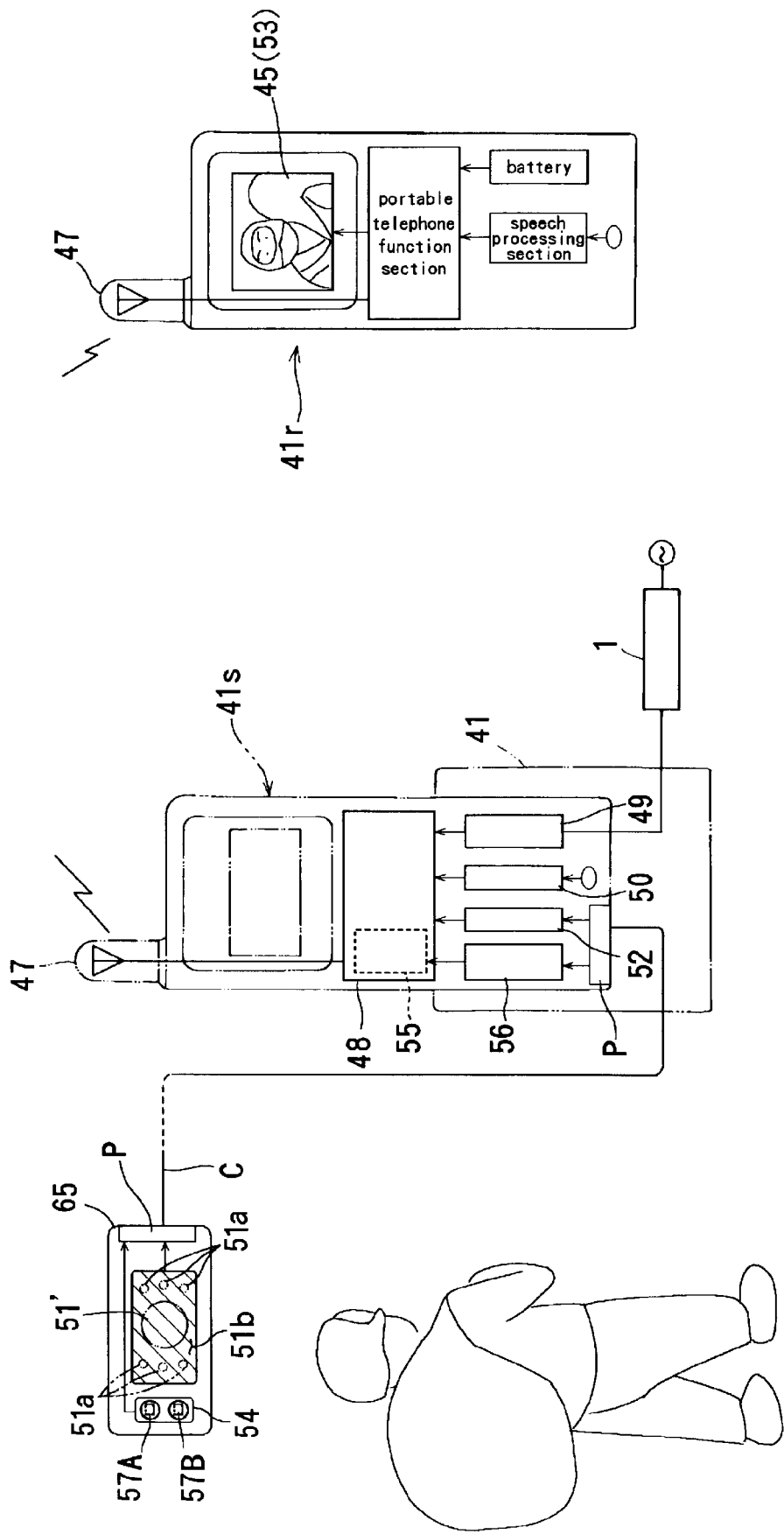
FIG. 17 is a perspective view of another modification of the image pick-up unit.

FIG. 17 is a view showing an example different from the communication device of the present invention shown in FIG. 16. In this example, a portable telephone equipped with a transmission function is provided with a surveillance camera 65 separately from the body of the portable telephone and the surveillance camera 65 comprises the image pick-up unit 51', a light source 51a and infrared detecting unit 54 including infrared sensors 57A and 57B. The surveillance camera 65 can communicate with the body of the portable telephone through a communication cable C connected to, for example, a communication port P of the portable telephone, so that the camera 65 can be freely placed at an inconspicuous site where surveillance is desirably conducted. On the other hand, the body of the portable telephone is placed at a site that is located in good electromagnetic wave conditions but which cannot be seen from a site of a surveillance objective.

With the above construction and arrangement, a person under surveillance will find it further harder to discover the existence of a communication device of the present invention and its performance as a crime preventive device can be improved. It should be appreciated that in this example as well, the image pick-up unit 51' loaded on the surveillance camera 65 not only uses only rays in the range of from the visible rays to the near infrared rays in a limiting manner but may also use the far infrared rays and the infrared rays in the intermediate range. In a case where the latter two kinds of infrared rays are used, the light source 51a is not necessary to be provided as is detailed above.

Furthermore, while in this example, the surveillance camera 65 is connected to the body of a portable telephone through the communication cable C, the present invention is not limited to the communication cable C as a connection link, but electromagnetic waves may be used for cordless communication as a connection. In addition, in this example, since the surveillance camera 65 is provided with the infrared sensors 57A and 57B, shooting can get started when a person to be surveyed comes close to the camera 65 or a still picture can be stored in an image buffer (not shown), but in the present invention, mounting of the infrared sensors 57A and 57B is not limited to the interior of the surveillance camera 65.

Figure 14:
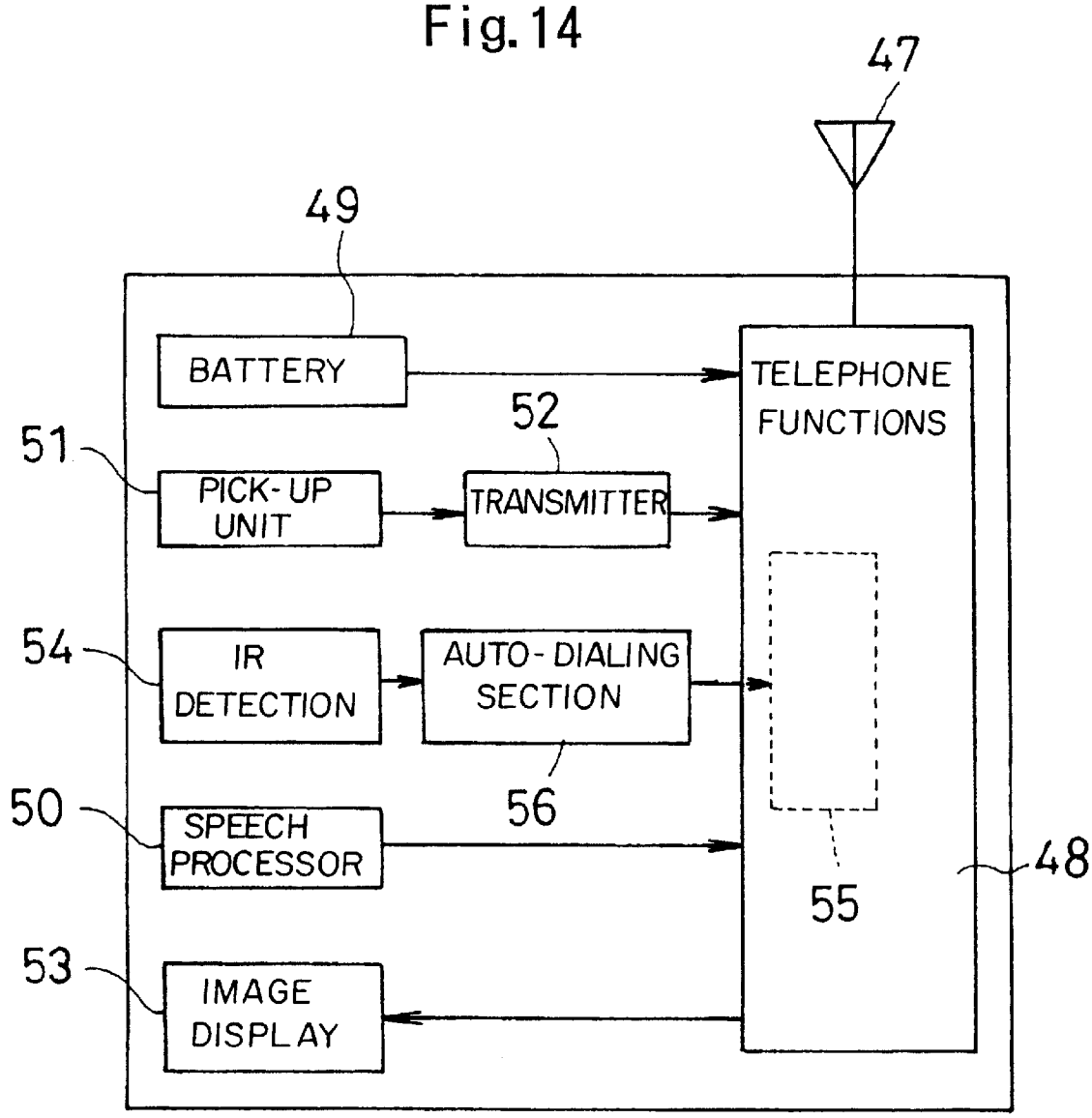
FIG. 14 is a block diagram of various functional sections included in the portable telephone.
Figure 15:
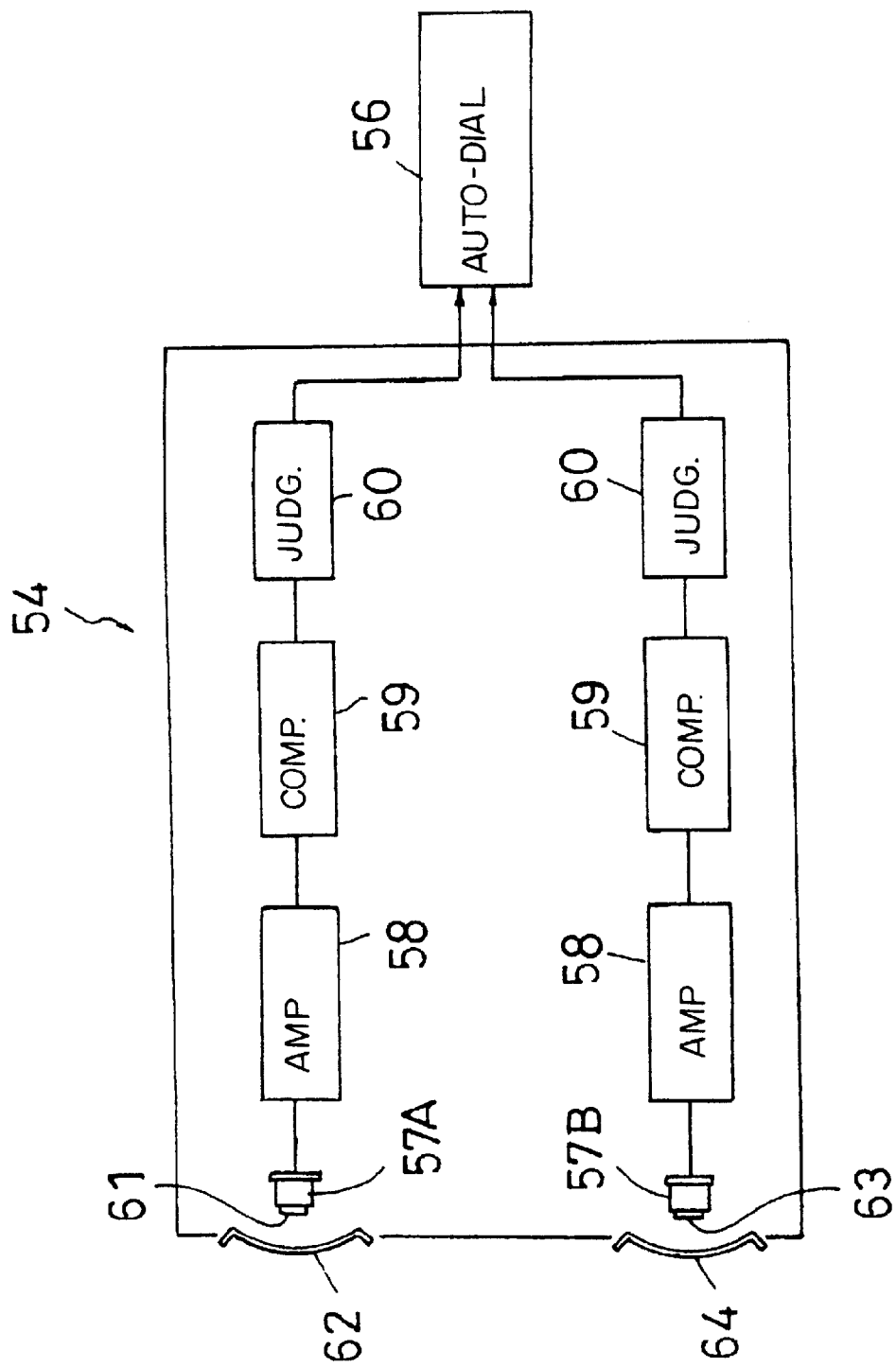
FIG. 15 is a block diagram of infrared detecting unit.

In this example, the portable telephone 1s on the sender side has no image display section 45 and the portable telephone 1r on the recipient side has neither of image pick-up units 51 and 51'. That is, in carrying out the present invention, neither the image display section 45 nor the image display unit 53 are not necessary to be provided to the portable telephone 1s on the sender side, and the image pick-up unit is not necessary to be provided to the portable telephone 1r on the recipient side either. Hence, portable telephones on the sender side detailed already using FIGS. 13 to 15 are not required to have the image display section 45 and the image display unit 53 equipped thereto.

Figure 18:
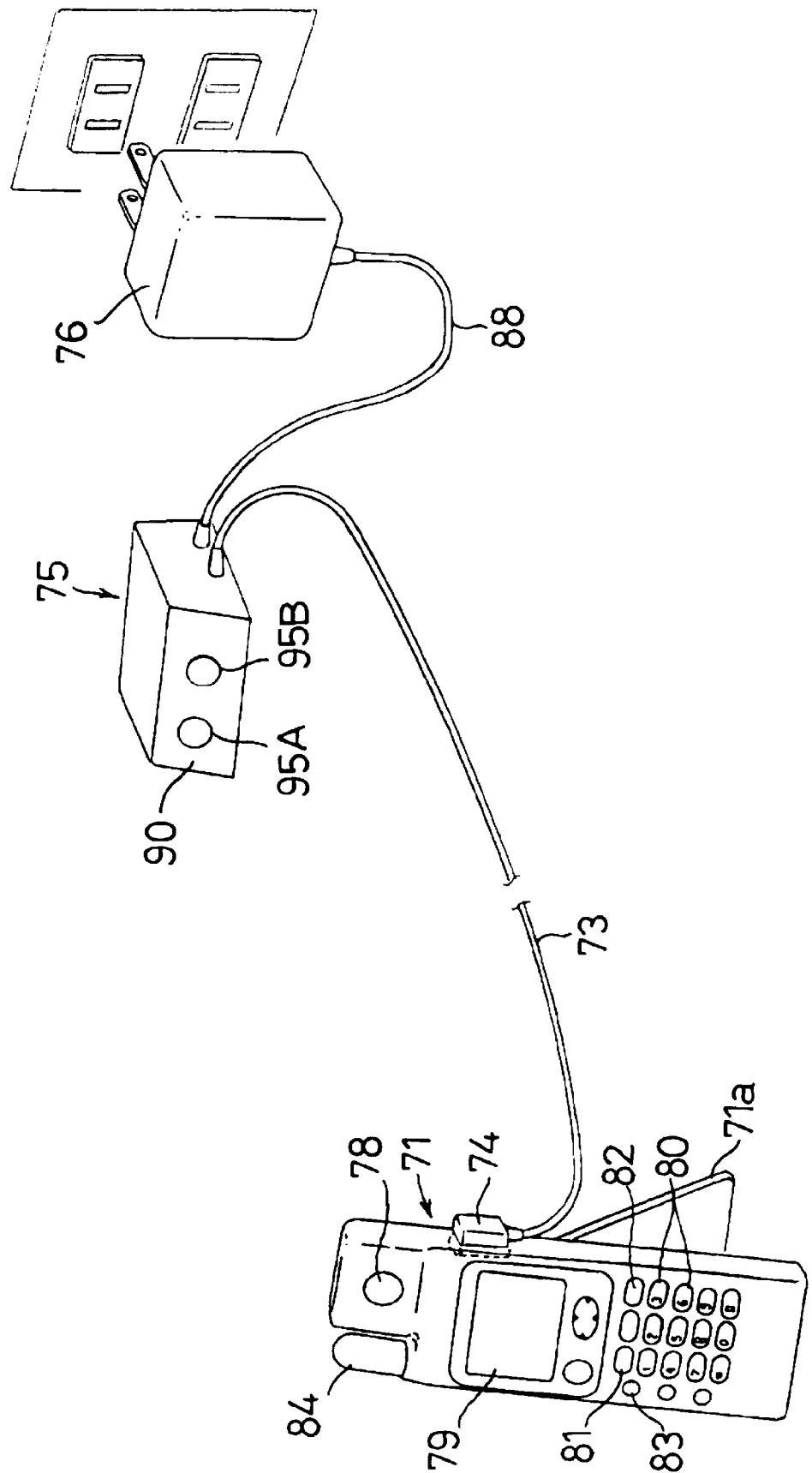
FIG. 18 is a perspective view of a communication device including an auxiliary device for communication.
Figure 19:
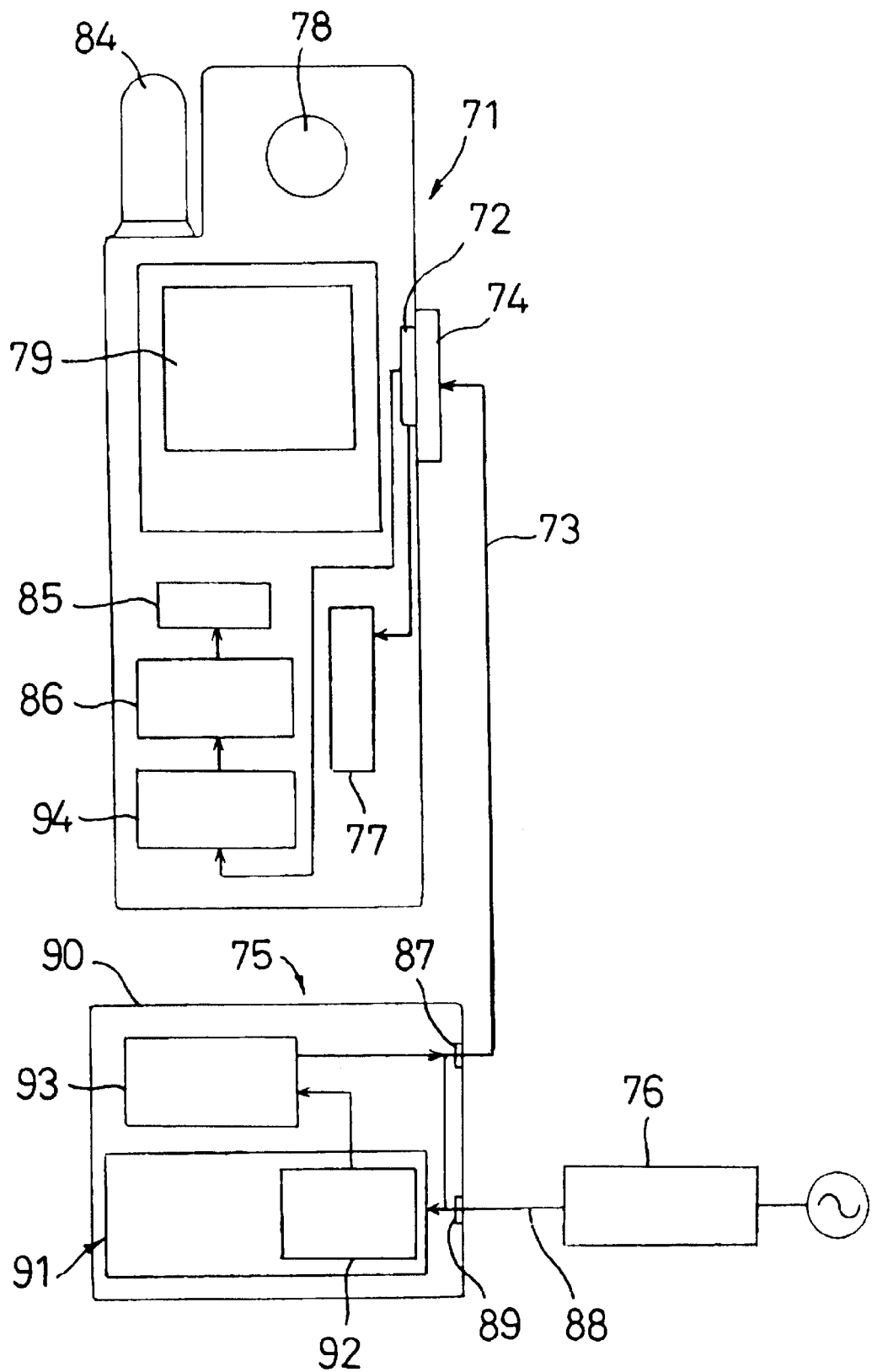
FIG. 19 is a block diagram of various functional sections equipped to a communication device.

Description will be given of an embodiment of the sixth aspect of the present invention with reference to accompanying drawings. FIG. 18 shows a communication device according to the embodiment of the sixth aspect of the present invention and, as shown in a block diagram of FIG. 19, this communication device is constructed such that an auxiliary device 75 for communication is connected to an external connection terminal 72 for connection of an optional part of a portable telephone 71 through a lead line 73 and a plug 74 and an AC adapter (stabilized power source) 76 is connected to the auxiliary device 75 for communication. In this embodiment, a battery 77 of the portable telephone 71 can be charged while power is supplied to the auxiliary device 75 for communication.

The portable telephone 71 is equipped with an image pick-up unit 78 and image display unit 79 and has a transmit/receive function of speech and image on commercial electromagnetic waves and further comprises a dial buttons 80, an execute/terminate buttons for conversation 81 and 82, a menu button 83 for presenting contents of various functions (lists of directory numbers and abbreviated numbers of the recipients and so on) provided to the portable telephone on image display unit 79, and an antenna 84 of a telescopic type.

Furthermore, the portable telephone 71 has a function that when a telephone of the other party in communication is disconnected, a conversation terminating operation is automatically performed (this operation is to be ready for the next dialing, in which conversation termination is established after a short time such as, for example, 15 second or 30 second elapses, provided that a set time is desirably adjustable) and in addition to this function, communication circuitry 85 and a dialing setting unit 86 for calling a specified telephone on the recipient side are included as internal constituents. The portable telephone 71 is further constructed such that the portable telephone 71 is equipped with a folding stand 71a, thereby enabling an inclined posture in a self-supported manner.

On the other hand, the auxiliary device for communication 75 is of a desktop type and constructed such that detecting unit 91 for detecting a human body and a fire around the front surface section of a vessel 90, an abnormality judging unit 92 for judging abnormality based on a predetermined output signal from the detecting unit 91 and an auto-dialing instruction originating section 93 are housed in the vessel 90 provided with a connection terminal 87 for the lead line 73 and a connection terminal 89 for a lead line 88 from the AC adapter 76, wherein the auto-dialing instruction originating section 93 issues abnormality judgment information from the abnormality judging unit 92 as an instruction to the auto-dialing instruction receiving section 94 on the portable telephone 71 side to call at least one telephone preset by the dialing setting unit 86 automatically.

Figure 20:
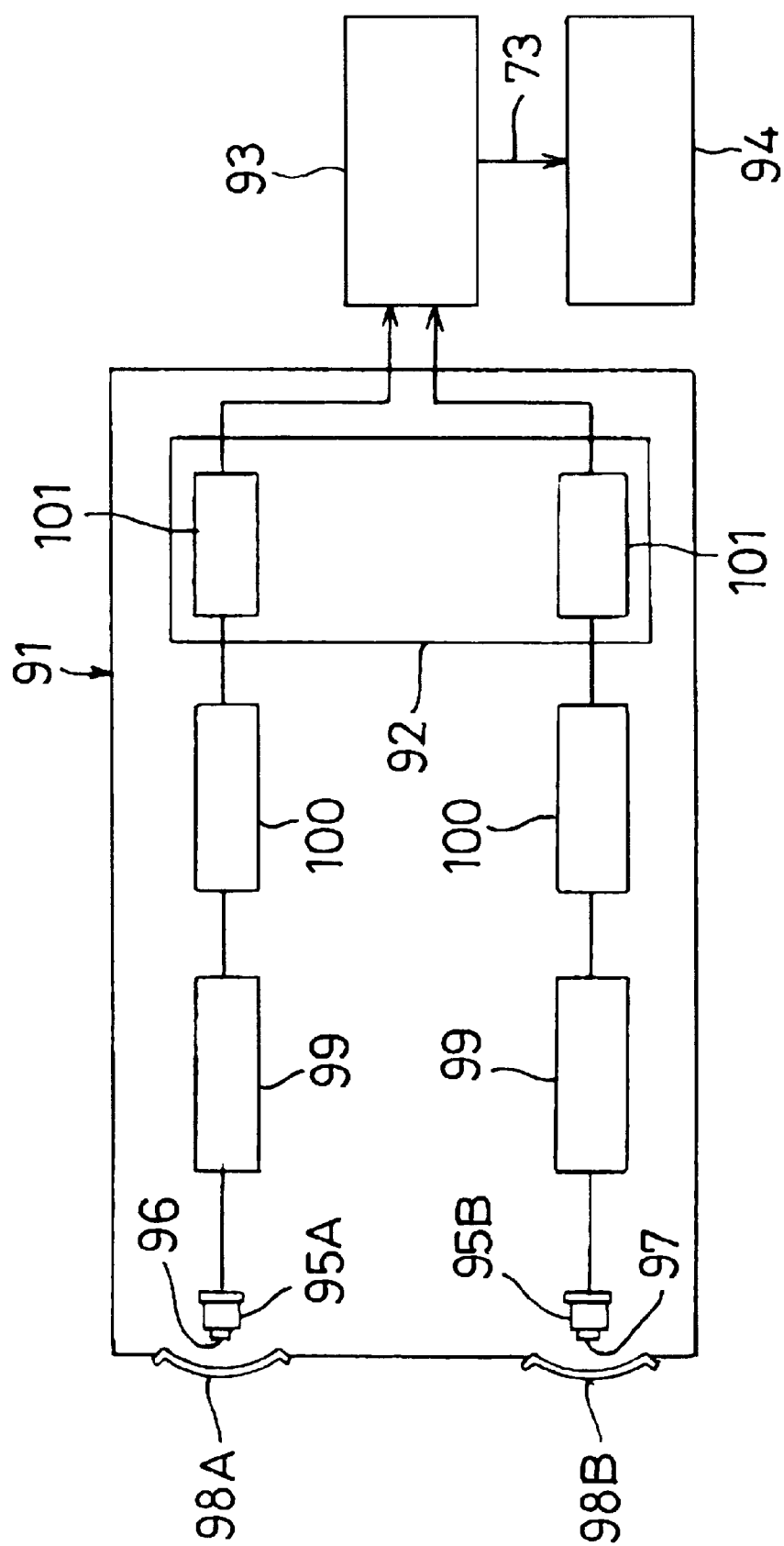
FIG. 20 is a block diagram of human body and fire detecting unit.

The above described detecting unit 91 for a human body and a fire, as shown with a block diagram of FIG. 20, is equipped with two sensors 95A and 95B for detection of a human body and detection of a fire, respectively, and in this embodiment, as the sensors 95a and 95B, infrared detectors of a pyroelectricity type or a thermopile type are used.

To be more precise, the detecting unit 91 is equipped with the infrared sensor 95A for detecting a human body mounted with a 10 μm band pass filter 96 so as to detect infrared rays in the vicinity of 10 μm in wavelength radiated from the human body and the infrared sensor 95B for detecting a flame mounted with a 4.3 μm band pass filter 97 so as to detect infrared rays in the vicinity of 4.3 μm in wavelength radiated from the flame, wherein a collective lens 98A is placed at the front surface section of the sensor 95A, while an infrared transmission cover 98B is placed at the front surface section of the sensor 95B.

An amplifier 99, a comparator 100 and a judging section 101 are connected in series to each of the sensors 95a and 95B, a dial command is output to an auto-dialing instruction originating section 93 from an abnormality judging section 92 based on a predetermined output signal of detection of a human body or/and a fire, and the dial command signal is sent to an auto-dialing instruction receiving section 94 by way of a lead line 73 from the auto-dialing instruction originating section 93.

According to the auxiliary device for communication with the above described construction, infrared rays radiated from a human body of a person is detected by the infrared sensor 95A when the person intrudes into the infrared detection area under influence of the detecting unit 91 for a human body and a fire. An abnormality judging section 92 judges abnormality based on the detection and the judgment result is entered into the auto-dialing instruction receiving section 94 though a lead line 73 from the auto-dialing instruction originating section 93, whereby the dialing setting unit 86 calls at least one preset telephone on the recipient side automatically.

On the other hand, when a fire breaks out in the infrared detection area under influence of the detecting unit 91 for a human body and a fire, infrared rays radiated from the flame is detected by the infrared sensor 95B for detecting a fire, the abnormality judging section 92 judges abnormality based on the detection, the judgment result of fire breaking out is entered into the auto-dialing instruction receiving section 94 through the lead line 73 from the auto-dialing instruction originating section 93, whereby the dialing setting unit 86 calls at least one preset telephone on the recipient side automatically this time as well. At this time, one of specified recipients may selectively be called according to whether a person intrudes or a fire breaks out.

Therefore, when a plurality of portable telephones 71 on the sender side each with an auxiliary device 75 for communication with the above described construction are placed at predetermined sites in a warehouse and other buildings for example and a telephone on the recipient side equipped with speech and image transmit/receive functions is made ready to use and further a directory number of the telephone on the recipient side is entered into the dialing setting means 86 of a portable telephone on the sender side, then intrusion of a suspicious person is detected by the sensor 95A for a human body when the suspicious person intrudes into the infrared detection under influence of the sensor 95A for a human body in a warehouse, while a flame of a fire is detected by the sensor 95B for a fire when the fire breaks out.

In such a situation, a predetermined output signal from the detecting unit 91 is entered into the dialing setting unit 86 through the auto-dialing instruction originating section 93 and further the dialing setting unit 86 calls a preset telephone on the recipient side automatically. At this time, when the telephone on the recipient side is switched over to a communication session based on the calling, a picture around the portable telephone 71 on the sender side (that is, a picture of an intruder or a fire) is displayed on the image display unit of the telephone. It can instantly recognized with the visual and auditory senses in a remote manner whether a calling by auto-dialing is caused by detection of a human body or detection of a fire.

At this point, in a case of crime prevention, the lead line 73 connected to an external connection terminal 72 of the portable telephone 71 is extended and the auxiliary device for communication 75 is desirably placed at a site not conspicuous on a shelf or some place like that. When a plug socket is not available in the vicinity of an inconspicuous site, the lead line 88 from the AC adapter 76 connected to the auxiliary device for communication 75 may also be extended.

It should be appreciated that, while, in this embodiment, infrared detectors of a pyroalectricity type or a thermopile type are used as the sensors 95A and 95B for detecting a human body and a fire, effects similar to that of the auxiliary device for communication 75 can be obtained if, as a sensor 95A for a human body, any of an ultrasonic detector and a near infrared detector detecting near infrared rays in the vicinity of 1 μm in wavelength is selected, or if, as a sensor for a fire 95B, any of a thermal sensor, a smoke sensor, and a ultraviolet sensor is selected, or further if plural kinds of sensors with different detecting functions is combined, though detailed descriptions thereof are omitted here.

Figure 21:
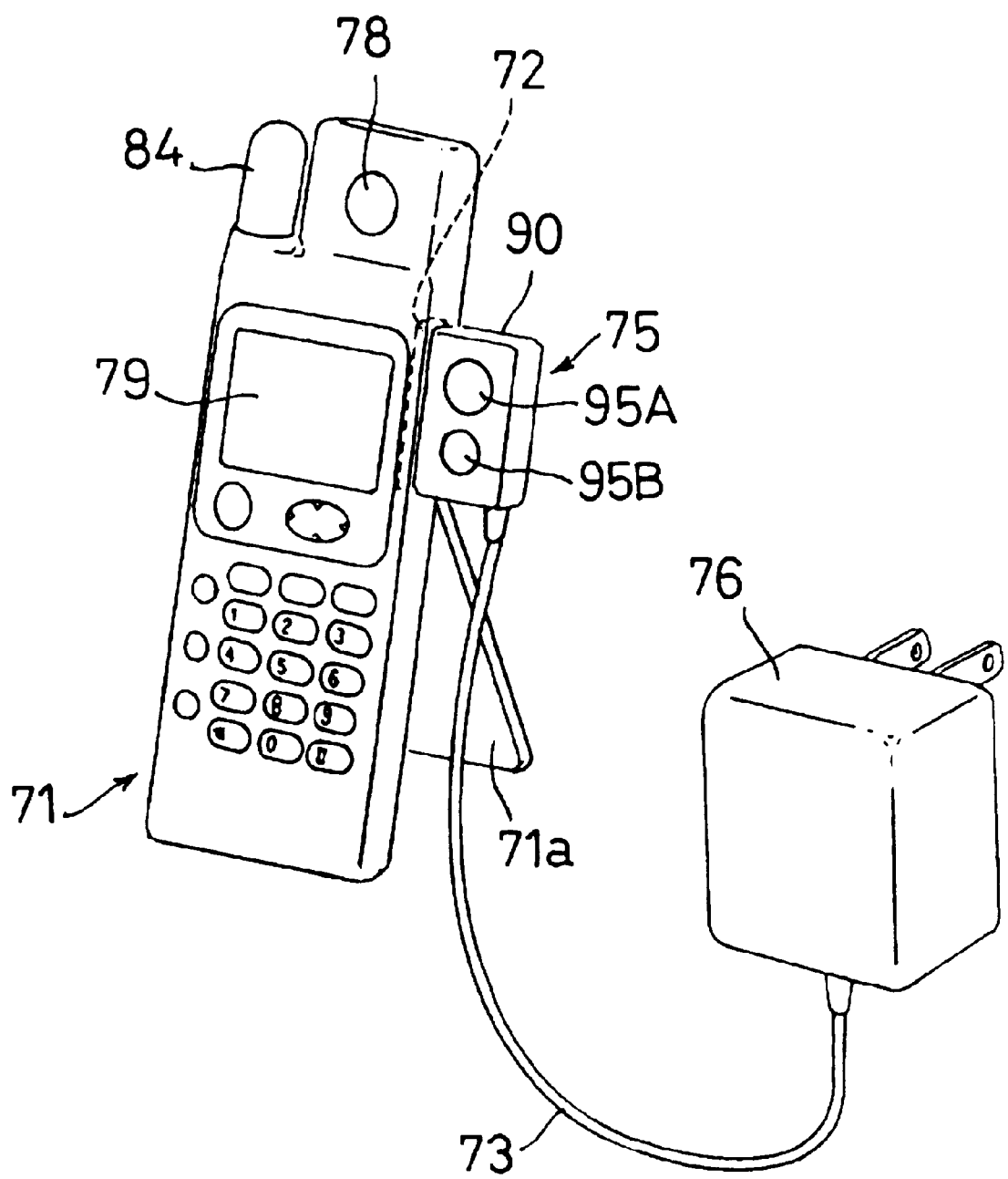
FIG. 21 is a perspective view of a communication device according to a first other embodiment.

Communication devices according to other embodiments are shown in FIGS. 21 to 24. A communication device shown in FIG. 21 is constructed such that the lead line 73 in the communication device shown in FIG. 18 is eliminated, the auxiliary device for communication 75 connected to the AC adapter 76 in the communication device shown in FIG. 18 is connected directly to an external connection terminal 72 of a portable telephone 71.

Figure 22:
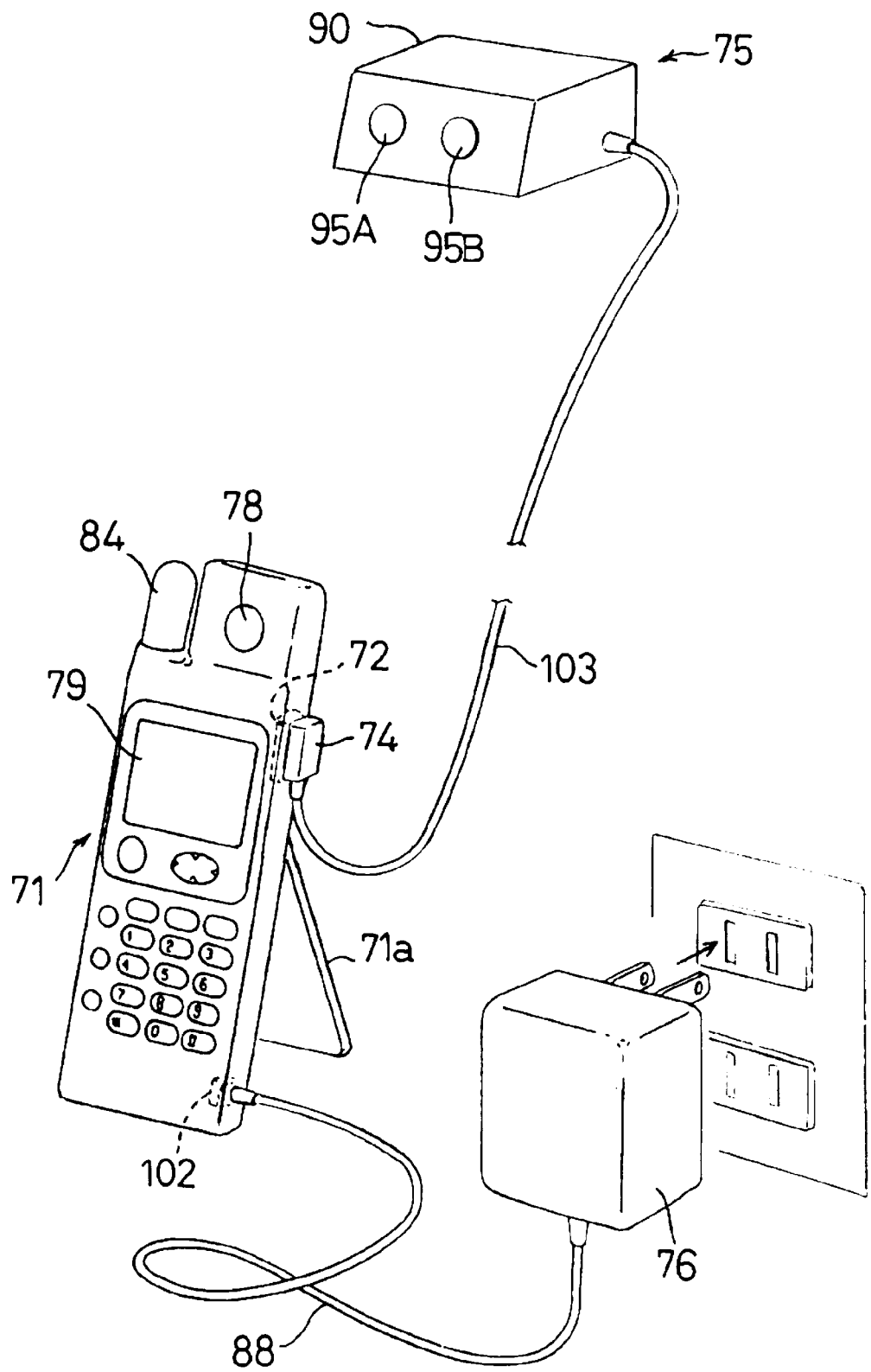
FIG. 22 is a perspective view of a communication device according to a second other embodiment.

A communication device shown in FIG. 22 is constructed such that an external connection terminal 72 and a charge terminal 102 are separately provided to portable telephone 71 and not only is the AC adapter 76 connected to the portable telephone 71 through a lead line 88 but an auxiliary device for communication 75 is connected to the portable telephone 71 through a lead line 103 to supply power to the auxiliary device for communication 75 from the AC adapter 76.

Figure 23:
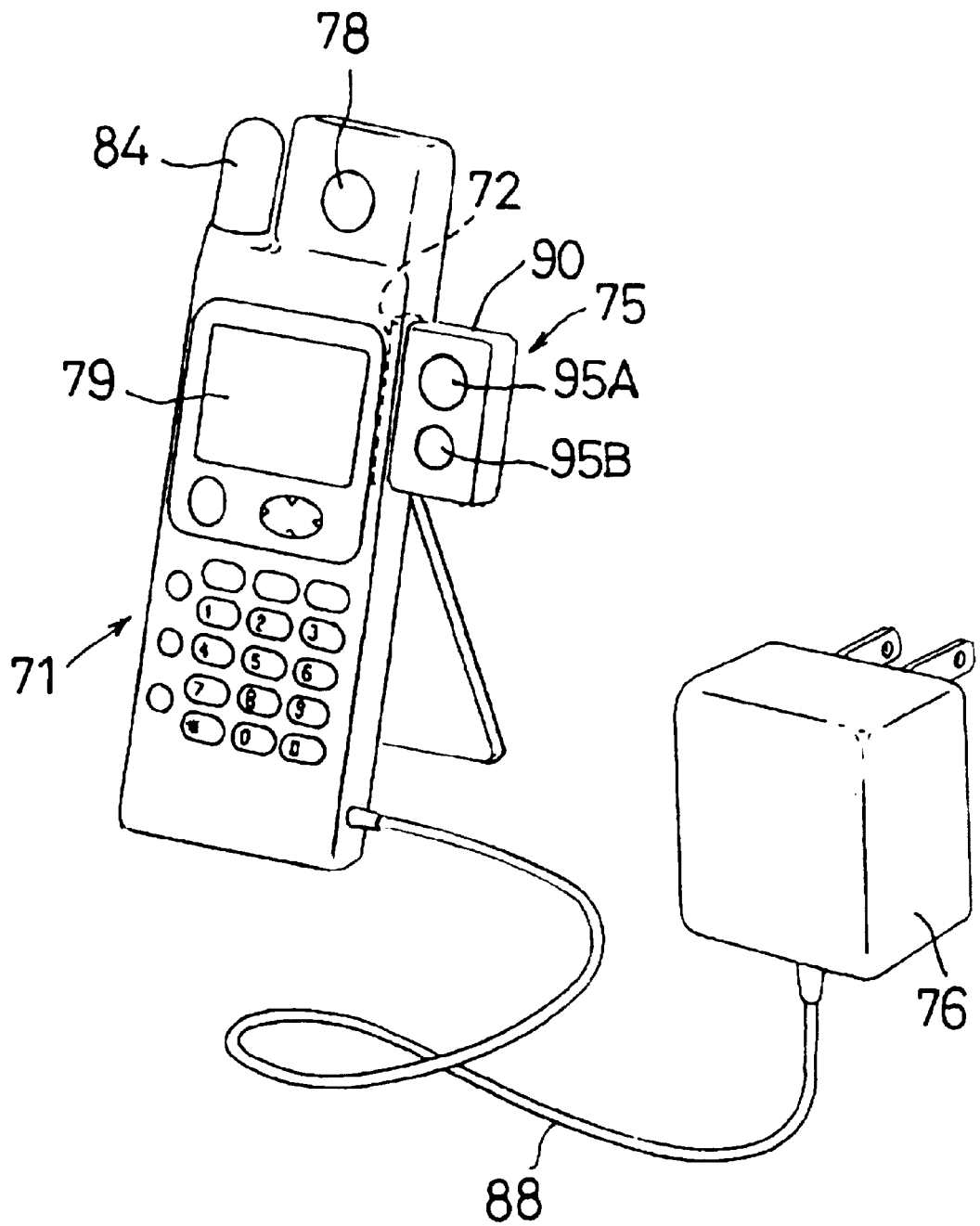
FIG. 23 is a perspective view of a communication device according to a third other embodiment.

A communication device shown in FIG. 23 is constructed such that the lead line 103 in the communication device shown in FIG. 22 is eliminated and the auxiliary device for communication 75 is connected directly to an external connection terminal 72 of the portable telephone 71.

Figure 24:
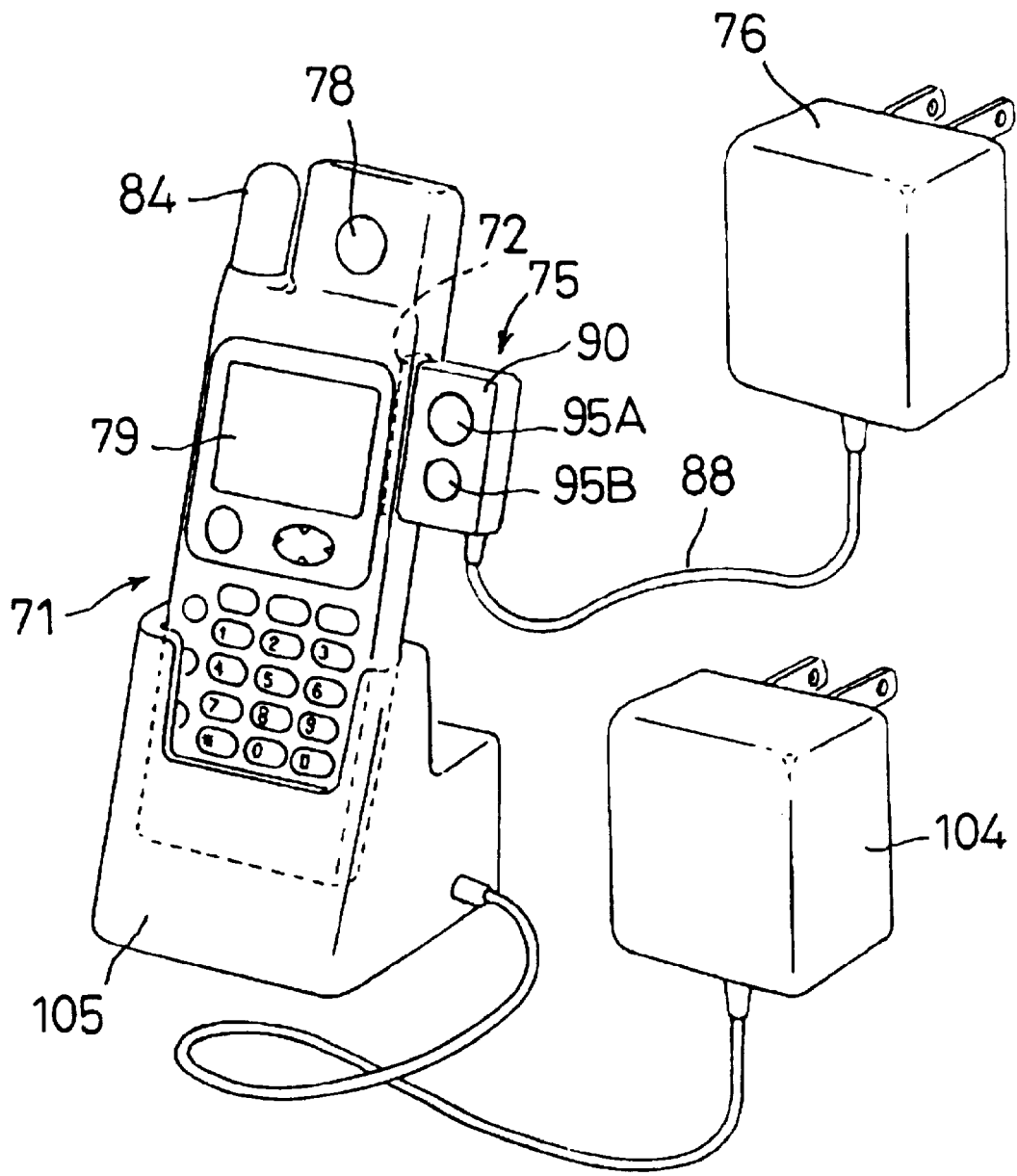
FIG. 24 is a perspective view of a communication device according to a fourth other embodiment.

A communication device shown in FIG. 24 is constructed such that the lead line 73 in the communication device shown in FIG. 18 is eliminated, the auxiliary device for communication 75 connected to the AC adapter 76 in the communication device shown in FIG. 18 is connected directly to an external connection terminal 72 of the portable telephone 71, on one hand, so as to omit battery charge by way of the auxiliary device for communication 75 from the AC adapter 76 and on the other hand, so as to perform charging of the portable telephone 71 by inserting the portable telephone 71 into a charge stand 105 connected to the adapter 104.

In the above described various embodiments, communication devices may alternatively be constructed such that the AC adapter 76 is omitted and power is supplied to the auxiliary device for communication 75 from a battery 77 of the portable telephone 71, or a vessel 90 of the auxiliary device for communication 75 has a dedicated battery as an internal constituent and power is supplied to the auxiliary device for communication 75 from the battery.

Further, while an auto-dialing instruction originating section 93 is included in the vessel 90 as an internal constituent, needless to say that the auto-dialing instruction originating section 93 can be included in the portable telephone 71.

It should be appreciated that in the above described embodiments, since crime prevention, welfare and so on and fire prevention are objectives, the detecting unit 91 for a human body and a fire is equipped as the auxiliary device for communication 75, but if some of the objectives are not necessary to be achieved, the auxiliary device for communication 75 is constructed in other ways such that in a case where crime prevention and welfare and so on are objectives, a detection system for a fire is omitted, on the other hand, in a case where a fire prevention is an objective, a detection system for a human body is omitted and in addition, in both cases, these two kinds of auxiliary devices for communication may be combined so as to concurrently realize crime prevention, welfare and so on and fire prevention.

Figure 25:
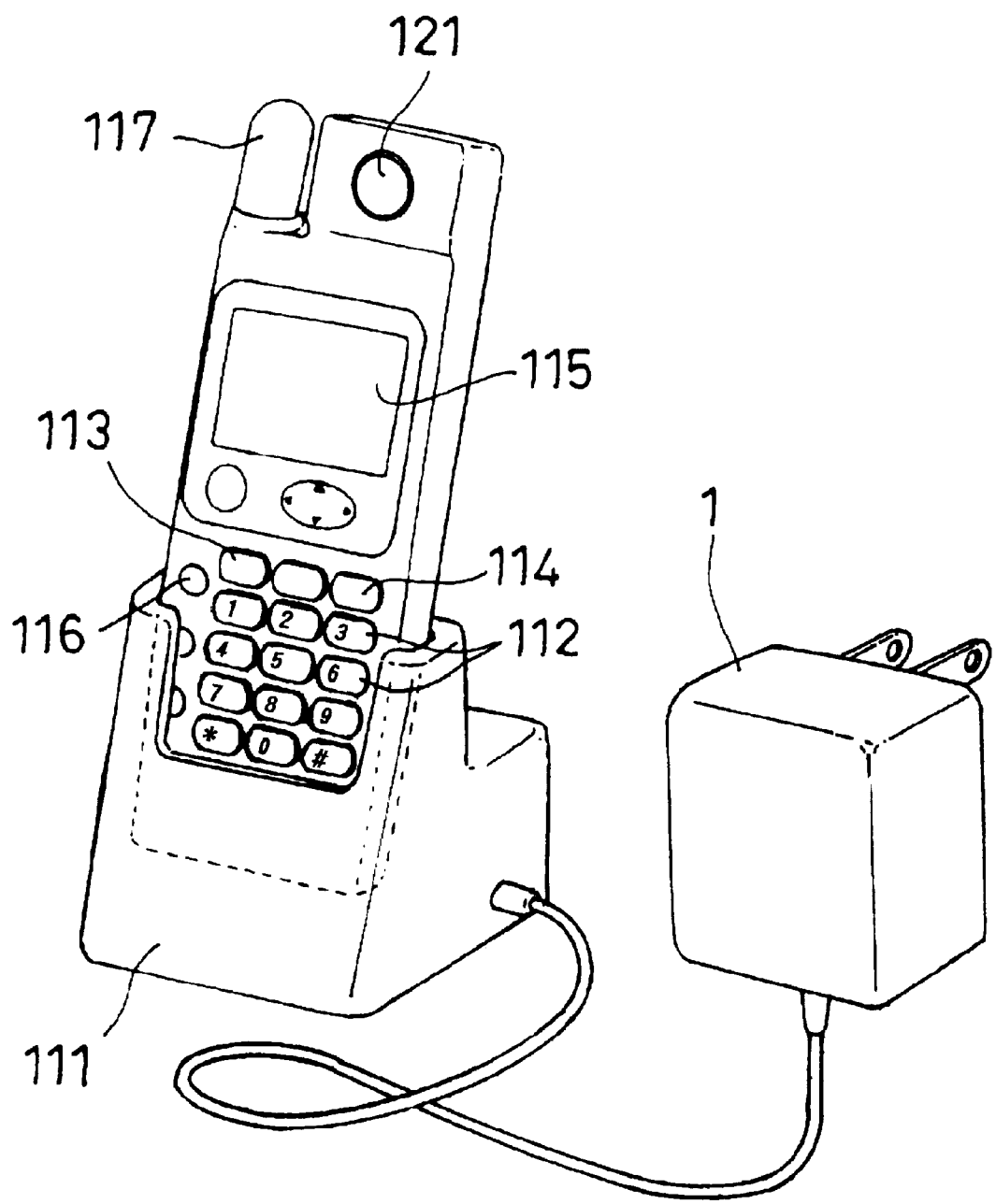
FIG. 25 is a perspective view of a portable telephone in a case where a communication device is the portable telephone being set in a charger.
Figure 26:
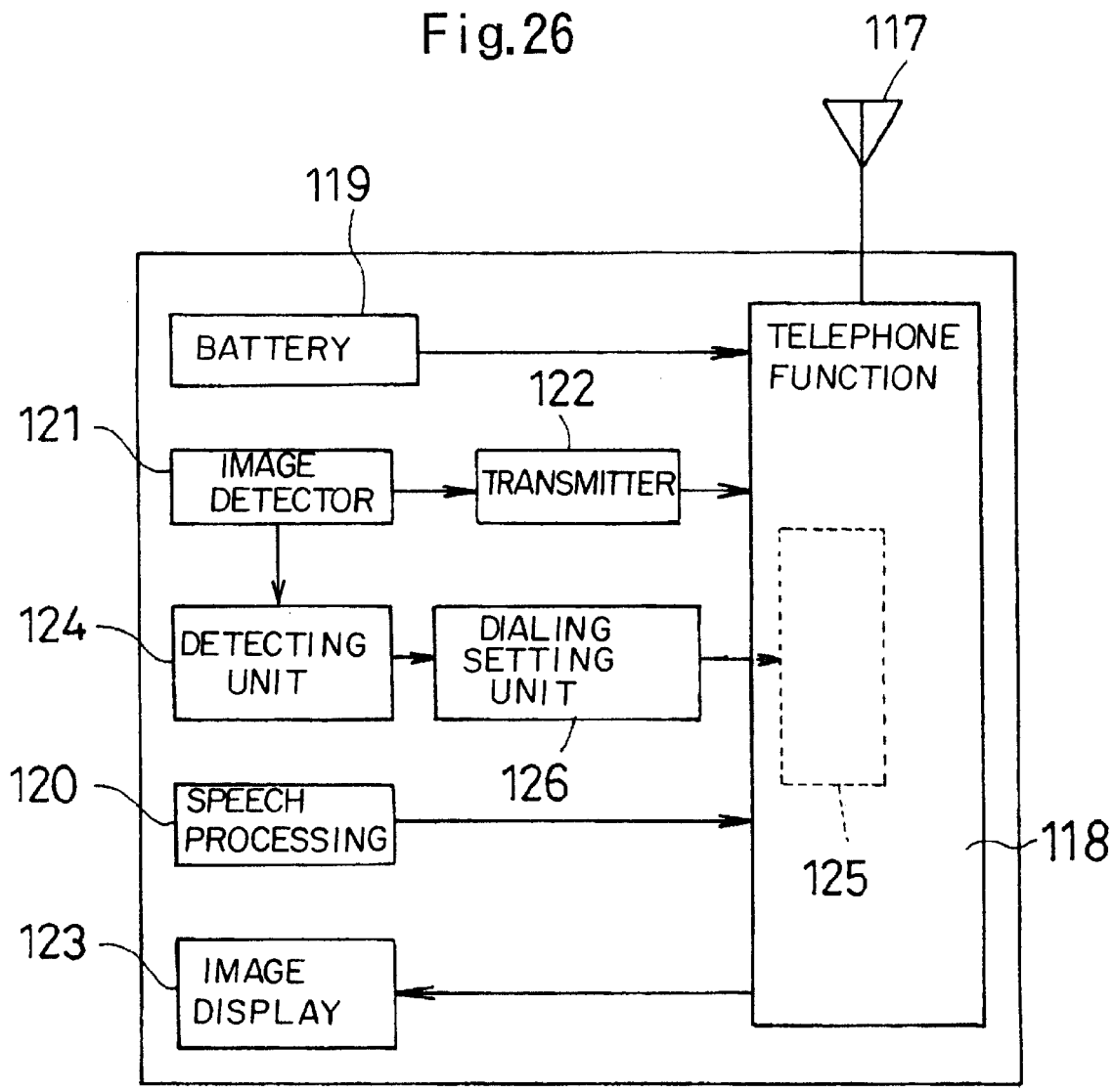
FIG. 26 is a block diagram of various functional sections included in a portable telephone in a case where a communication device is the portable telephone.

Description will be given of cases where a communication device in any of the third to fifth aspect of the present invention is a portable telephone below with reference to accompanying drawings. FIG. 25 shows a perspective view of a portable telephone set in a charger 111 connectable to an AC/DC converter 1 and the portable telephone has a speech transmission function on commercial electromagnetic wave and comprises dial buttons 112, execute/terminate buttons for conversation 113 and 114, a menu button 116 presenting contents of various functions (lists of directory numbers and abbreviated numbers of the recipients and so on) provided to the portable telephone on image display unit 115, and an antenna 117 of a telescopic type and in addition to these, as shown in a block diagram of FIG. 26, further comprises a portable telephone function section 118, a battery 119 and speech processing section 120 as internal constituents.

A communication device of the present invention is constructed such that the device comprises an imaging unit 121 for capturing an image around the front surface section of the portable telephone, a transmitting unit 122 for transmitting captured image information to the recipient side, image display unit 123 for presenting image information (picture) from the sender side as a picture on an image display section 115, subject change detecting unit 124 detecting a change in the subject image, connected to the image pick-up unit 121, a dialing setting unit 125 for calling a preset telephone with an image display function on the recipient side (one example of line setting unit) and an auto-dialing function section 126, wherein an operating signal is entered into the dialing setting unit 125 from the auto-dialing function section 126 based on a predetermined output signal from the subject change detecting unit 124, which signal is output as a timing of calling at a change in subject which the image pick-up unit 121 awaits while shooting and then at least one preset telephone with an image display function is automatically called by the dialing setting unit 125.

Figure 27:
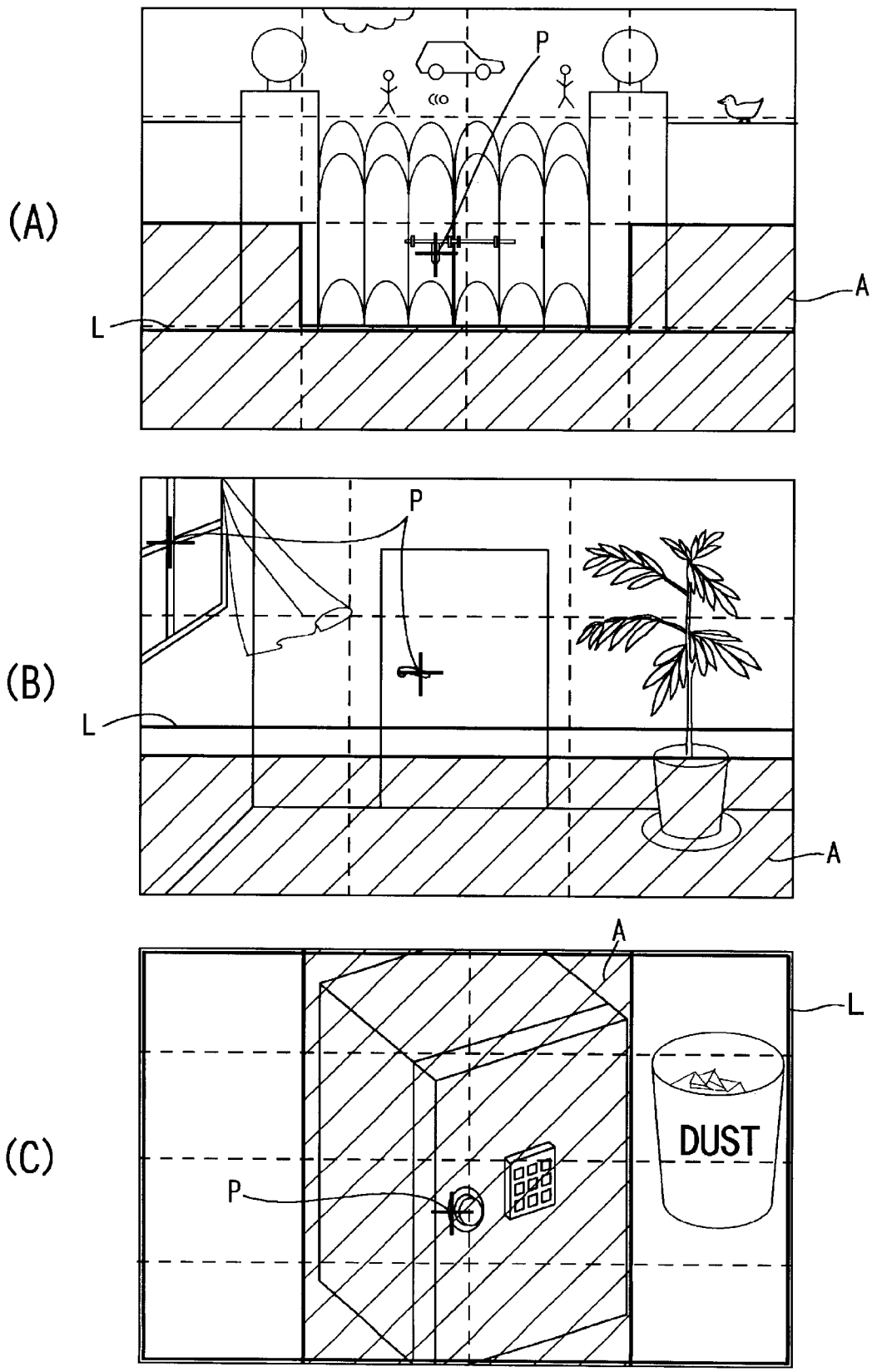
FIGS. 27A–C is a pictorial illustration for description of setting examples for shooting subjects each for detecting a change therein.

FIGS. 27(A) to 27(C) each are pictorial illustrations showing a setting example of a target subject in a picture picked up by the image pick-up unit 121. FIG. 27(A) shows an image example when the image pick-up unit 121 is set, for example, directing the imaging outwardly from the front door of a user's home, FIG. 27(B) shows an image example when the image pick-up unit is set so as to be directed towards an entrance door from the inside of a room and FIG. 27(C) shows an image example when the image pick-up unit 121 is set so as to be directed to a safe. FIGS. 27(A) to 27(C) each includes three or four cases where one point P (pixels in a point constituting a target subject) is set, one line L (pixels in a straight line constituting a target subject) is set and an area A (pixels in an area constituting a target subject) or a line L enclosing an area (pixels in a plurality of straight lines constituting a target subject) is determined.

In the case of FIG. 27(A), a gate at the front door is shot by the image pick-up unit 121, wherein as subjects, designation are performed of one point P in part of a look of the gate at the front door, a straight line L in a horizontal direction, corresponding to the boundary of a user's estate and an area A constituted of surfaces of the estate and a fence. A setting method of a straight line L is implemented, for example, by setting at least one of a vertical and horizontal lines and setting methods for an area A can be conceived in various ways in which, for example, all of the shot picture is divided into several blocks and a subject is one block selected from the groups consisting of the blocks as the area A for more ease.

Therefore, a preset telephone with an image display function on the recipient side is called at a time period when a change occurs in part P, L and A of the subject, whereby it is detected that an intruder in any sense is present in the premises and an image can be transmitted. Further, even in a shooting area, passersby, vehicles in traffic flow, movement of an animal and furthermore, changes caused by natural phenomena such as by a wind cannot be detected at any place except for part P, L and A of the subject image.

In a case of FIG. 27(B), likewise, a point P on a knob for opening and closing, of an entrance door as a subject, a straight line L in a lateral direction delimiting the lower half of the door and an area A of the lower half of the door are set, whereby not only is detection of an intruder performed with sureness, but sways of a curtain or a plant and the like movements are not detected.

In a case of FIG. 27(C), a point P on a dial of a safe and an area A including all of the safe are set as a subject, thereby enabling detection of a person who is introduced into the image area adjacent the safe. Further when a line L constituting a rectangle or boundary of an outer frame is set as a subject target, a change in the subject can be caught by comparison with more ease of simplicity, thereby enabling detection of movements of a person who comes in or goes out of the shooting area with certainty.

It should be appreciated that, while image pick-up elements such as CCD and CMOS can be conceived as the image pick-up unit, an image pick-up unit of CMOS is preferable, because of low power consumption, for use in a portable type communication device.

As described above, one point P, a straight line L and a limited area A constituting important portions as a subject on a picture image are set, thereby enabling capture of a change in the subject with more simplicity and certainty. That is, not only are simplification and cost saving of the subject change detecting unit achieved but less occurrences of false recognition can be assured.

It should be appreciated that there is no need that the entrance area that is imaged to detect intrusion of a suspicious person need include all of a target objective since only the specified parts P, L and A can be imaged (detecting only specified pixels) and with this target subject setting, all of the object area can be imaged, for the first time, after a change in the target subject matter image is detected, thereby resulting in less power consumption. Furthermore, in FIG. 27(C), when subjects in two categories, that is: a line L and the inside enclosed by L are shot independently of each other, only a straight line region is dedicated for the detecting target while the inside enclosed by L is used for acquiring a two dimensional image and only the straight line is put into operation so as to await a detection of a change in the target subject image indicating an intruder, then image processing and arithmetic processing sections for detecting the changes can be simplified, thereby enabling a power saving.

Further, it should be appreciated that the above described ways of setting of P, L and A of the subject image do not limit the scope of the present invention thereto but simply discloses examples set out in consideration of crime prevention as a main offset. That is, there are many schemes available and many different image points can be set as a subject P, a vertical line segment or freely drawn curves determined by a user can be set as a subject L, an area enclosed by an arbitrary line may be set as a subject A. Furthermore, a subject P, L and A can be set in combination so that a composite change is detected before an event is determined.

According to a portable telephone with the above construction, when a person intrudes into an area set as a target subject image in a shooting area of image pick-up unit 121, then a change in the subject image is detected by the subject change detecting unit 124, the change is further entered into the auto-dialing function section 126 through the judging section 130 and the dialing setting unit 125 is operated, whereby the portable telephone function section 118 calls a specified, preset telephone with an image display function on the recipient side.

On the other hand, when a fire breaks out in the shooting area of the image pick-up unit 121, likewise, a change is entered into the auto-dialing function section 126 and the dialing setting unit 125 is operated, whereby the portable telephone section 118 calls a specified, preset portable telephone with an image display function on the recipient side. At this time, one of the specified individual recipients may selectively be selected according to whether a person intrudes or a fire breaks out.

Therefore, not only are a plurality of portable telephones with the above described construction on the sender side placed distributing at predetermined sites in a warehouse and other buildings for example, but a telephone with the above described construction is made ready for use as a telephone on the recipient side, and further a directory number of the telephone on the recipient side is entered into the dialing setting unit 125 of a portable telephone on the sender side, then a suspicious person is caught by the subject change detecting unit 124 as a change in the subject image that the image pick-up unit 121 awaits when the suspicious person intrudes into the area set as a target subject image in the shooting area of the image pick-up unit 121, while when a fire breaks out, a flame of the fire is caught by the subject change detecting unit 124 similar to the case of intrusion of a suspicious person.

In such a situation, a predetermined output signal from the subject change detecting unit 124 is entered into the dial setting unit 125 through the auto-dialing function section 126, whereby the dialing setting unit 125 calls a preset telephone on the recipient side automatically. When the telephone on the recipient side is switched over to a communication session based on the call, a picture of the area around the portable telephone on the sender side (that is a picture of an intruder or a fire) is displayed on the image display section 115 of the portable telephone based on information from the image display unit 123.

It should be appreciated that when an image buffer storing image information at the time of a change of the subject image is provided in the portable telephone, a situation can be avoided in which a initial status of the fire or the intrusion becomes impossible to confirm due to a time loss till communication is established with the telephone on the recipient side from a time when an output signal from the subject change detecting unit 124 is received on the recipient side.

Figure 28:
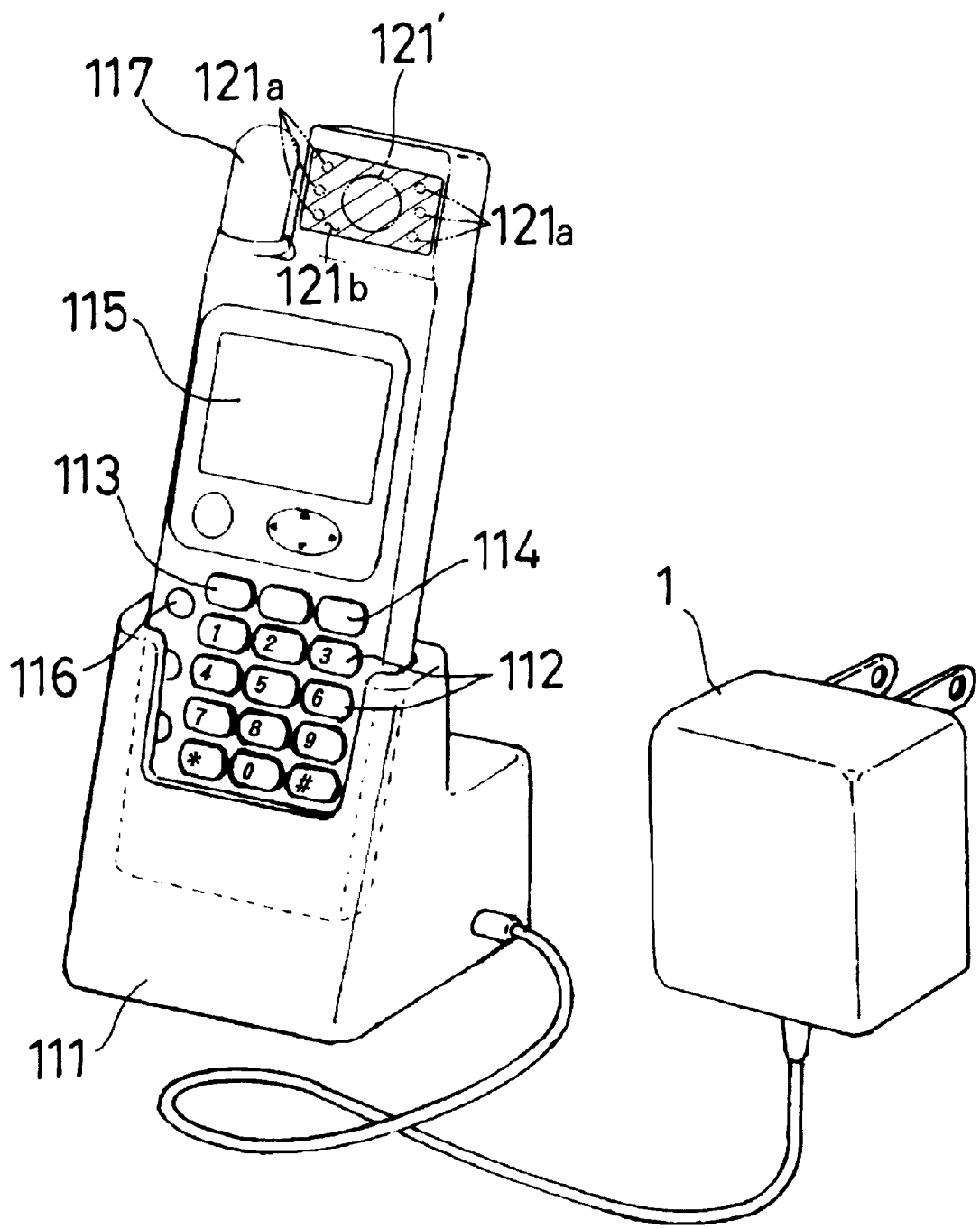
FIG. 28 is a perspective view of a modification of image pick-up unit.

FIG. 28 is a view showing another example of an image pick-up unit when a communication device is a portable telephone. The imaging unit 121' shown in this example is a camera shooting an image including wavelengths of near infrared rays and the camera 121' is one to shoot an image of wavelengths including near infrared rays (for example, in the range of from 0.7 $\mu$m to 1.5 $\mu$m) as one example. An alphanumerical mark 121a indicates a light emitting diode as one example of a light source of near infrared rays and an alphanumerical mark 121b indicates a transmission window extending over the light emitting diode 121a and the camera 121' which are mounted inside the portable telephone.

In this example, since the camera 121' includes the near infrared rays in addition to wavelengths in the visible light range as light wavelengths for use in shooting an image, a picture picked up by the camera 121', even in the dark, can be realized close to a visible image seen by the naked eye and therefore, the shooting with wavelengths including the above near infrared rays is suitable for identifying a person under surveillance. Since near infrared rays radiated from the light source 121a cannot be seen directly by the naked eye, the rays are not conspicuous and a person under surveillance should not be conscious of the presence of the camera 121' through being exposed to the rays from the light source 121a, which is advantageous in crime prevention.

Besides, when a transmission window 121b is provided, the camera 121' can be less conspicuous. It should be appreciated that the present invention is not limited to wavelengths of light rays for the camera 121' to use in shooting an image to wavelengths of rays in the visible range and the near infrared range. That is, infrared rays in an intermediate range (1–5 $\mu$m to 5 $\mu$m in wavelength) and in the far infrared range (5 $\mu$m to 100 $\mu$m in wavelength) may be used for imaging. Further, in the present invention, there is no limitation in shooting an intensity distribution of infrared rays as an infrared ray image, but shooting may be made to achieve a wavelength distribution of infrared rays as an infrared ray image.

When wavelengths of rays for use in shooting are infrared rays in the intermediate range or/and the far infrared range, a light source like the light emitting diode 121a is omitted and infrared rays radiated from a human body can be realized as an image. That is, a person under surveillance cannot find out the camera 121' is using the light source 121a as a clue since a passive image is realized upon.

Figure 29:
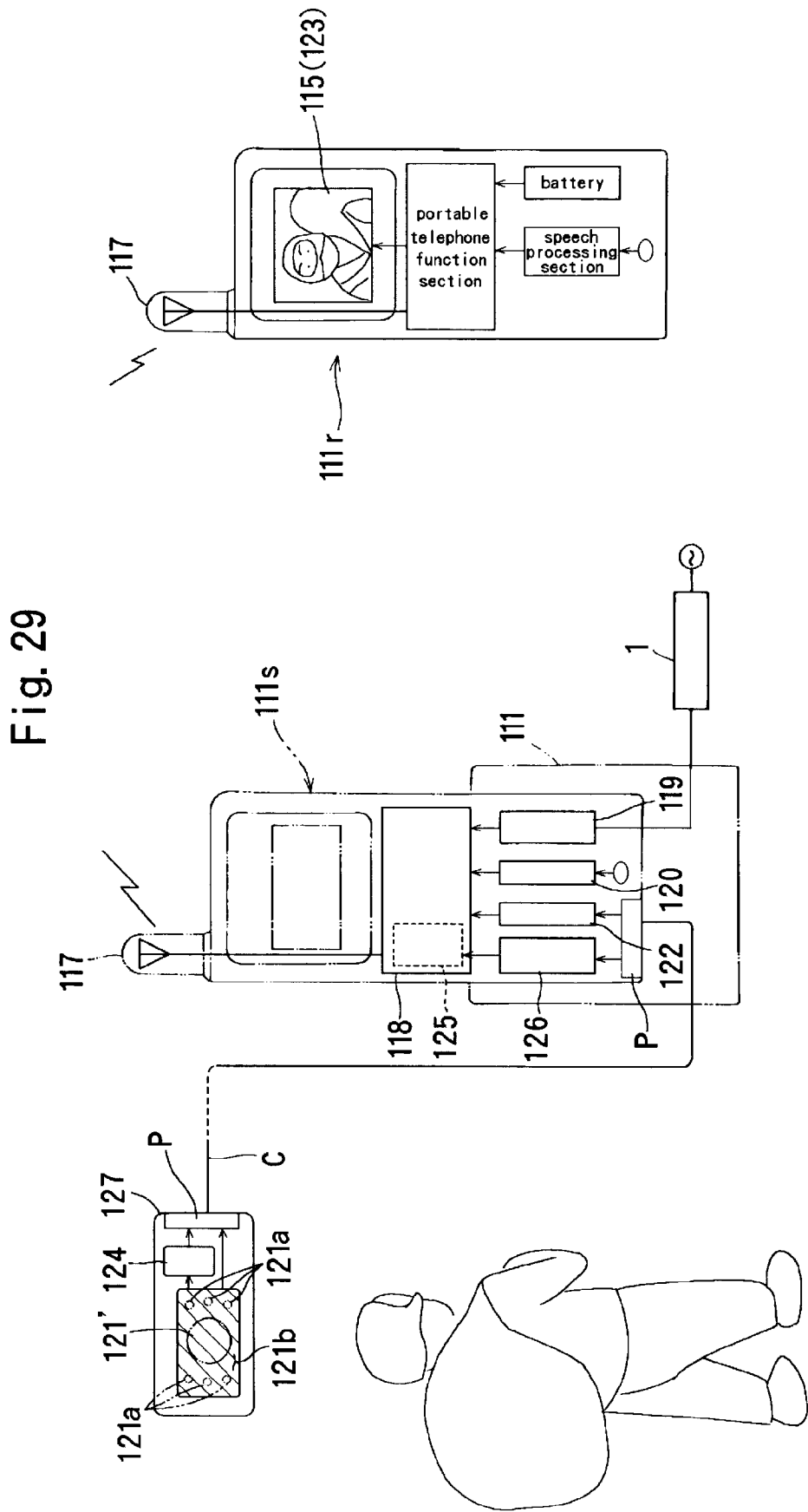
FIG. 29 is a front view of another modification of the image pick-up unit.

FIG. 29 is a view showing an example other than the communication device of the present invention shown in FIG. 28. In this example, a portable telephone with a transmission function is employed, a surveillance camera 127 is provided separately from a body of the portable telephone and the camera 127 has the image pick-up unit 121' and a light source 121a therefor. The surveillance camera 127 can be connected to the body of the portable telephone through the communication cable C connected to, for example, a communication port P of the portable telephone, which makes it possible for the camera to be freely placed at a site that is desirably selected for surveillance but is not conspicuous. On the other hand, the body of the portable telephone is placed at a site, other than the site of the camera, which site is in good electromagnetic wave conditions and which site can not be seen by an objective under surveillance.

With the above described construction and arrangement, a person under surveillance would find it difficult to discover a communication device of the present invention, thereby enabling its performance as a crime preventive device to be increased. It should be appreciated that, in this example as well, the image pick-up unit 121' loaded on the surveillance camera 127 may be one shooting a subject image using not only rays in the visible range or/and the near infrared range but rays in the near infrared range or/and the intermediate infrared range. The light source 121a is unnecessary when infrared rays in the latter two ranges are employed, as described above.

In addition, in this example, while the surveillance camera 127 is connected to the body of a portable telephone through the communication cable C, the present invention is not limited to this arrangement but may be connected by electromagnetic waves in a cordless manner. Furthermore, it is also possible in this example that shooting gets started when a person under surveillance comes close to the surveillance camera 127 or a still image is stored in an image buffer.

Further, in this example, a portable telephone 111s on the sender side is not provided with an image display section 115 while a portable telephone 111r on the recipient side is not provided with image pick-up units 121 and 121'. In other words, in carrying out the present invention, there is neither a need to equip an image display section 115 and image display unit 123 to the portable telephone 111s on the sender side nor a need to equip an image pick up unit to the portable telephone 111r on the recipient side either. Therefore, a portable telephone on the sender side, detailed already in any of FIGS. 25 to 28, is not required to be equipped with the image display section 115 and the image display unit 123.

Figure 30:
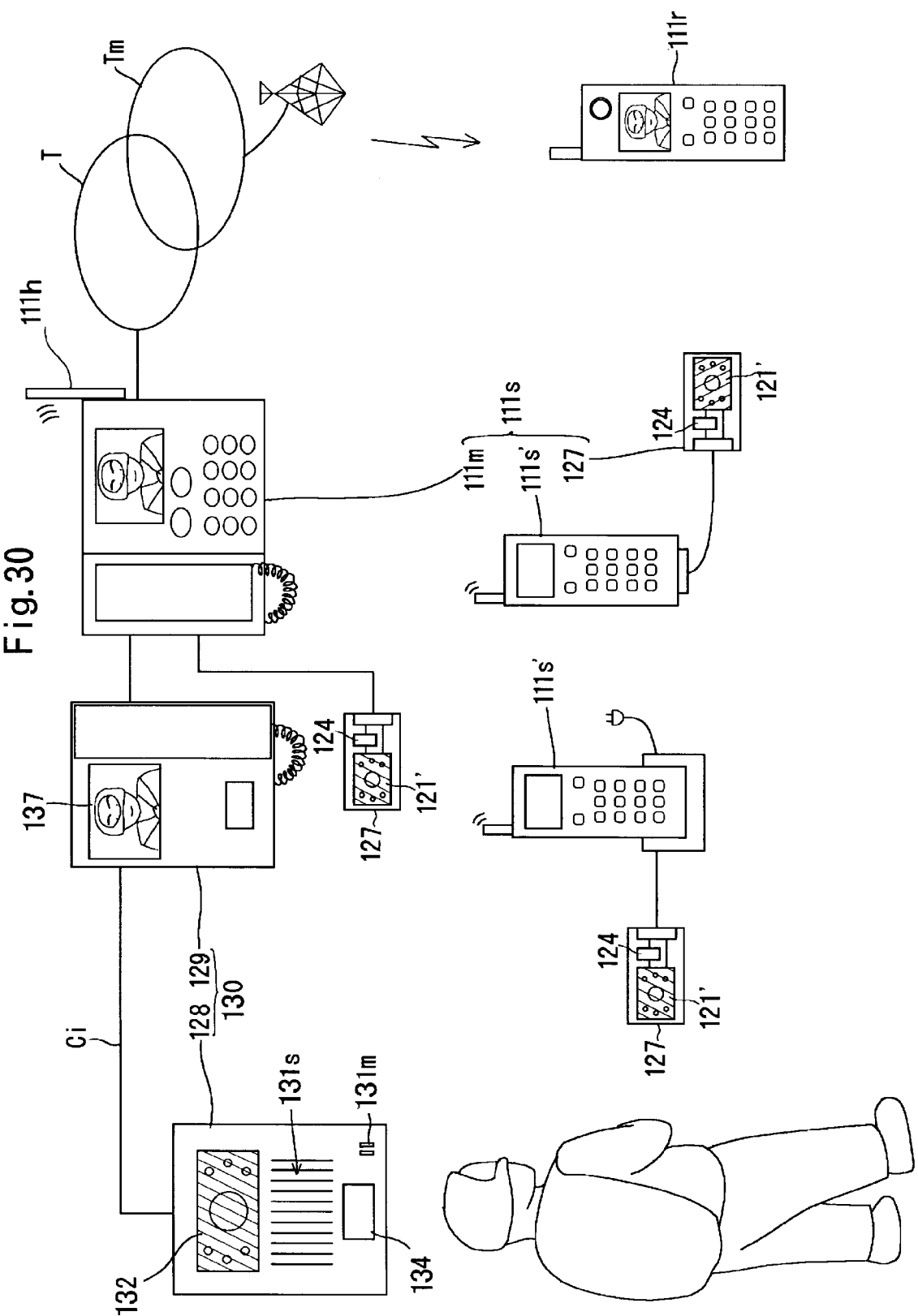
FIG. 30 is an illustration showing a system example in a case where the present invention is a telephone.

FIG. 30 is a view showing an example further different from those described above of the third to fifth aspects of the present invention. In this example, a telephone 111s which is a communication device on the sender side comprises a simple, easy portable telephone (PHS or personal handy phone system) 111s', the surveillance camera 127 detailed above, mounted to the PHS 111s' and a parent telephone 111m with a home antenna 111h of the PHS 111s' as an internal constituent. Further, the parent telephone 111m is connected to an interphone 20 with a monitor constituted of outdoor speech devices 128 and indoor speech devices 129.

The PHS 111s' is registered as a daughter telephone receiving/transmitting electromagnetic waves with the home antenna of the telephone 111m and can be placed any where the waves reach. In this example, for example, two PHS 111s' are used to enable the surveillance cameras 127 to be set at two sites of a user home. Therefore, when a change arises in a target subject image preset in a picture image picked up, a surveillance camera 127 calls a portable telephone 111r on the recipient side through the parent telephone 111m over a telephone line network T or a portable telephone line network Tm, thereby notifying an abnormality condition in the user's home immediately to the user.

It should be appreciated that while, in this example, when an image display section 115 is equipped to the telephone 111m, the user can recognize the abnormalities in sites inside the home, the present invention is not limited to this application. That is, it is also possible that the image display section 115 of the telephone 111m is omitted and if the image display section 115 is equipped to the telephone 111m, the image display section 115 is set so as not to display when setting the parent telephone 111m to an automatic unattended recording made of operation.

According to this example, as PHSs 111s' registered as daughter telephones receiving/transmitting electromagnetic waves with the home antenna of the telephone 111m increases in number, the surveillance cameras 127 can be placed at more sites, which contribute to improvement in crime preventive capability. It should be appreciated that a surveillance camera 127 may be one connected to PHS 111s' either through the charger 111, or through a connector.

Furthermore, as shown in the FIG. 30, a surveillance camera 127 may be connected directly to the telephone 111m. Further, in this example, since the telephone 111m is connected to an interphone 130 at the front door, a change in a subject image occurring in the vicinity of the front door of the user can be detected and a picked-up image can be transmitted.

Figure 31:
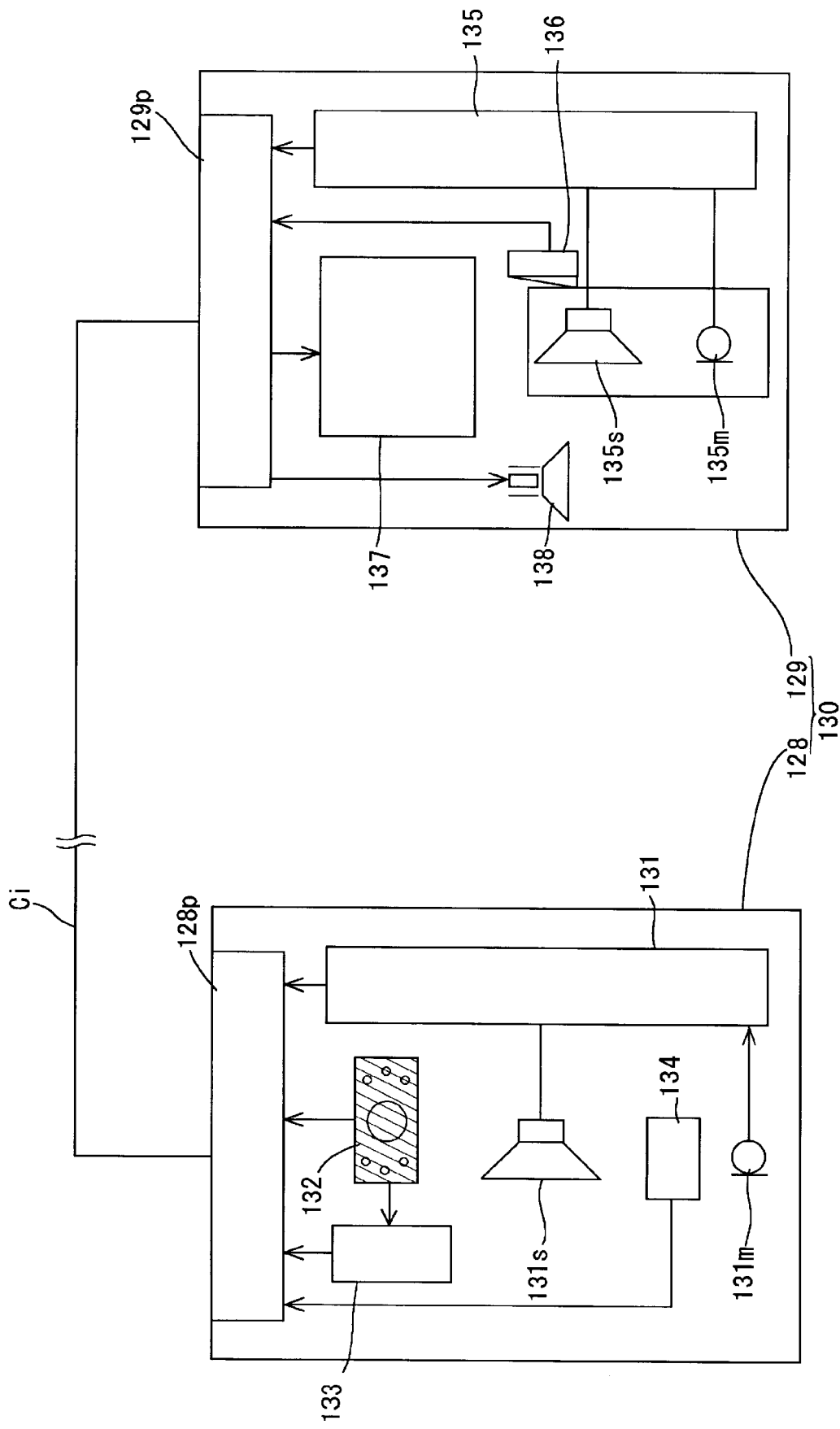
FIG. 31 is a block diagram showing a configuration of the telephone.

FIG. 31 is a block diagram describing the interphone 130. In FIG. 31, a numerical mark 131 indicates a speech processing section, alphanumerical marks 131s and 131m a speaker and a microphone connected to the speech processing section 131, a numerical mark 132 is an image pick-up unit shooting an infrared image of near infrared rays, a numerical mark 133 is a subject change detecting unit detecting a change in a subject from a shot image by the image pick-up unit 132, and a numerical mark 134 a calling button. Further, an alphanumerical mark 128p indicates a communication port connecting the speech processing section 131, the image pick-up unit 132 and the subject change detecting unit 133 to the indoor speech device 129 through a cable Ci for an interphone.

On the other hand, a system including the indoor speech device 129 comprises a speech processing section 135, a speaker 135s and a microphone 135m of the speech processing section 135, a hook switch 136 detecting that a receiver with the speaker 135s and the microphone 135m is taken up, an image display section 137 displaying a picture shot by the image pick-up unit 132, a chime sounding device 138 to be activated by pushing the calling button 134 and a communication port 129p connecting the above described constituents to the cable Ci for an interphone.

While, in the construction of the interphone 130, constituents except for the subject change detecting unit 133 are the same as those of an interphone with a monitor already on the market, but an arrangement associated with the subject change detecting unit 133 can be in many ways varied. In the present invention shown in this example, when the interphone with a monitor already on the market is equipped with the subject change detecting unit 133, the indoor speech device 129 can be called immediately at the instant at which a change occurs in the target subject image shot by the image pick-up unit 132.

That is, when the outdoor speech device 128 of the interphone 130 as shown in FIG. 31 is attached near the front door and an appropriate target subject image is set, not only can a visitor near the front door be informed to a family member by means of the chime sounding device 138 or like devices but the visitor can be displayed on the image display section 137, even if the visitor does not push the calling button 134. That is, when a guest visits the home, the guest can be recognized at an earlier time period.

Especially when the interphone 130 of this example is connected to a telephone 111m, as shown in FIG. 30, the telephone 111r with an image display function can be called when a change in the subject is detected by the subject change detecting unit 133. Therefore, when a portable telephone is set as a telephone 111r on the recipient side, it can be possible that not only is a guest visiting in a user's absence recognized but reasons the user cannot see the guest in person are explained by the user through conversation with the guest from a remote location.

Further, when a suspicious person approaches the front door, the person can be put under surveillance and an appropriate measure can be implemented. For example, it is possible that a user gets in contact with a friend residing in the close neighborhood of the user's home and asks the friend to check the conditions of the home.

Especially when a picture covering a broad area is shot by the image pick-up unit 132 as in the case of the interphone 130 of this example, it is important to prevent useless communication from occurring by presetting a subject properly to detect only a change in a preset target subject. It should be appreciated that when the interphone 130 is connected to a public communication network such as the telephone 111m, the subject change detecting unit 133 can be placed at not only a site in the outdoor speech device 128 side but at a site in the indoor speech device 129 side.

Further, when the construction of the subject change detecting unit 133 does not require a simple format, changes in the subject image may be detectable under a wide variety of combination of conditions.

As described above, the present invention can survey the occurrence of abnormalities using a communication device, whereby a security system can be constructed at a low cost without a large scaled wiring work.

Besides, especially in a case where a communication device is a portable telephone, alterations of surveillance sites can be made with great ease, interactive communication of speech and image can further be conducted and a portable communication device can also be satisfactorily used in the normal manner. In addition, according to the present invention, an intruder and a property can be remotely surveyed, in order to protect the property from a fire or the intrusion, in real time in a precise, cost effective manner by an individual or by a number of people with no help from a security company or a helper and further remote safety confirmation of human life can precisely be performed in real time at a low cost.

In a case where the image pick-up unit is to shoot an image of infrared rays, needless to say that not only can imaging be conducted even in the dark but a conspicuous light source is unnecessary, which makes it further possible for a placement site of a portable telephone as a crime preventive device to be not conspicuous. When the image pick-up unit is a surveillance camera that can be placed separately from a portable communication device, the surveillance camera can be more freely placed so to be less conspicuous.

It should be appreciated that, while, in this example, description is made of the case of a communication device being a portable telephone or an interphone, a communication device can be various devices such as for use in business radio communication, or amateur radio communication or fire prevention radio communications, or wired communications, with effects similar to the above described embodiments.

Those skilled in the art will appreciate that various adaptions and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A surveillance system comprising:
   a plurality of portable telephones, at least a first telephone having audio and image transmitting functions and a second telephone having audio and image receiving functions;
   an image sensor assembly for sensing images within a predetermined image area operatively connected to the first telephone and providing a first output signal upon detection of a predetermined amount of image change in the image area;
   a target setting unit for setting a predetermined sub-area of the predetermined image area as the area monitored for a predetermined amount of image change in the image area;
   an infrared detecting unit for detecting infrared rays from the monitored area and separately identifying the presence of a human body and a flame in the monitored area, and providing respective second and third output signals;
   an auto-dialing instruction originating section operatively connected to the first telephone for calling the second telephone automatically based on the first output signal whereby the second telephone is automatically sent an image of the image area upon the occurrence of the predetermined change in the image area; and
   a first judging unit for determining when the second and third output signals of the infrared detecting unit indicate an occurrence whereby the auto-dialing instruction originating section is activated to call pre-set telephones.

2. The surveillance system of claim 1 wherein the image sensor assembly is mounted on the first telephone.

3. The surveillance system of claim 1 wherein the first telephone has a chargeable battery and further including a holder for mounting the first telephone for charging the chargeable battery.

4. The surveillance system of claim 3 wherein the holder further includes an infrared sensor for mounting a second predetermined area and for providing an output signal to activate the auto-dialing instruction originating section.

5. The surveillance system of claim 4 wherein the infrared sensor is one of a pyroelectric sensor and a thermopile sensor.

6. The surveillance system of claim 4 wherein the infrared sensor senses infrared rays of at least 10 $\mu$m in wavelength to detect a human body.

7. The surveillance system of claim 1 wherein a third portable telephone having audio and image transmitting functions is set to provide a second predetermined image area whereby a network of surveillance portable telephones is provided.

8. The surveillance system of claim 7 wherein the target settling unit defines at least a straight line of pixels within the image area.

9. The surveillance system of claim 1 wherein the image sensor is mounted on a daughter device that is separate from and operatively connected to the first telephone.

10. The surveillance system of claim 1 further including a holder assembly for mounting the first telephone to provide a rotational adjustment of the telephone to define the predetermined image area.

11. The surveillance system of claim 1 wherein the image sensor is pivotally mounted on the first telephone to enable the user to subjectively define the predetermined image area.

12. The surveillance system of claim 11 further including an adjustable holder for mounting the first telephone at different positions relative to a supporting surface.

13. The surveillance system of claim 12 wherein the adjustable holder includes a support base, a pivotal holder body that is movably connected to the support base and a support link that can adjustably fix the pivotal holder body above the support base wherein the pivotal holder body can mount the first telephone.

14. The surveillance system of claim 1 wherein the image sensor assembly includes a second judging unit for determining the occurrence of the predetermined change in the image area.

15. A method of providing remote surveillance to a security object space, comprising:
   providing a plurality of portable telephones including a first telephone having audio and image transmitting functions and a second telephone having audio and image receiving functions, the first telephone having an image sensor for sensing images within a predetermined area operatively connected to the first telephone, an image target setting unit for defining less than the entire pixels defining the predetermined area as a target image area, a judging unit for determining when the image changes within the target image area, and an auto dialing instruction originating section for calling the second telephone automatically based on an output signal from the judging unit;
   positioning the portable first telephone to define a security area covered by the predetermined area of the image sensor by adjusting the position of the image sensor;
   setting the target image area to define a threshold of image change, within the target area, necessary to require surveillance;
   carrying the second telephone to a remote location;
   automatically dialing the second telephone when the threshold of image change is judged; and
   providing the image of the predetermined area directly to the second portable telephone at the remote location.

16. The method of claim 15 further including providing and positioning a third portable telephone to provide a network of surveillance portable telephones each capable of automatically calling and providing images to the second telephone.

17. A communication device for monitoring an area, comprising:
- a portable telephone having audio and image transmitting functions;
- a support holder for positioning the portable telephone;
- an infrared detecting unit for detecting infrared rays from the monitored area, and separately identifying the presence of a human body and a flame in the monitored area, and providing respective output signals;
- an auto-dialing instruction originating section connected to the portable telephone for calling a pre-set telephone having an image display function; and
- a judging unit for determining when output signals of the infrared detecting unit indicates an occurrence whereby the auto-dialing instruction originating section is activated to call the pre-set telephones.

18. The communication device of claim 17 wherein the infrared detecting unit is mounted on the support holder.

19. The communication device of claim 17 wherein the infrared detecting unit is remote from the portable telephone and the support holder.

20. A communication device, which is equipped with a telephone conversation function used on commercial electromagnetic waves, comprising:
- an image sensor;
- transmitting means for transmitting an image shot using the image sensor to a recipient;
- detecting means for detecting infrared rays to particularly identify the presence of either a human body or a flame; and
- dialing setting means for calling a preset telephone with an image display function of the recipient, wherein a predetermined output signal from the infrared detecting means is entered into the dialing setting means, so that the preset telephone with an image display function of the recipient is automatically called.

21. A communication device according to claim 20 wherein an infrared sensor mounted to the detecting means for detecting infrared rays is a pyroelectric type or a thermopile type, and at least one of a sensor sensing infrared rays of 10 $\mu$m in wavelength radiated from a human body and a sensor sensing infrared rays in the vicinity of 4.3 $\mu$m in wavelength radiated from a flame equipped.

22. An auxiliary device for communication comprising:
- detecting means for detecting infrared rays and particularly identifying at least one of a human body and a fire equipped to a vessel connected to an external connecting terminal of a portable telephone provided with a speech and image transmitting function using commercial electromagnetic waves; and
- an auto-dialing instruction originating section for calling a specified telephone of the recipient based on a predetermined output signal from the detecting means automatically depending on whether a human body is identified or a flame is identified while specifying the telephone equipped with an image display function for the recipient is equipped to one of a portable telephone, a holder for the portable telephone and the vessel connected to the holder.

23. An auxiliary device for communication according to claim 22 wherein a sensor as a human body detecting means comprises at least one of a pyroelectricity type or a thermopile type infrared detector detecting infrared rays in the vicinity of 10 $\mu$m in wavelength, an ultrasonic wave type detector and a near infrared detector detecting near infrared rays in the vicinity of 1 $\mu$m in wavelength.

24. An auxiliary device for communication according to claim 23 wherein the detecting means includes a fire sensor comprising at least one of a pyroelectricity type or a thermopile type infrared flame detector detecting infrared rays in the vicinity of 4.3 $\mu$m in wavelength, a thermal detector, a smoke detector and an ultraviolet detector.

25. An auxiliary device for communication according to claim 22 further including an image means for providing shot image information from a sender side to a specified telephone is operatively connected to the portable telephones.

26. A method of providing remote surveillance to a security object space, comprising:
- providing a portable telephone having a human body detecting sensor for sensing infrared rays radiated by a human body, a fire detecting sensor for sensing infrared rays radiated by a flame, a judging unit for judging whether a human body or a flame has been detected, and an auto dialing instruction originating section for calling a predetermined location automatically based on an output signal from the judging unit;
- positioning the portable telephone to define a security area covered by the human body detecting and fire detecting sensors;
- detecting the presence of at least one of a human body and a flame in the security area; and
- automatically dialing a respective predetermined location based on whether a human body or a flame is detected in the security area.

27. The method of claim 26 wherein said portable phone further includes an image sensor for sensing image information within said security area, the method further comprising:
- sensing image information of said security area upon the detection of either a human body or a flame in said security area;
- transmitting said sensed image information of said security area to the respectively dialed predetermined location.

28. A surveillance system comprising:
- a plurality of portable telephones, at least a first telephone having audio and image transmitting functions and a second telephone having audio and image receiving functions;
- an image sensor assembly for sensing images within a predetermined image area operatively connected to the first telephone;
- a target setting unit for setting a first predetermined sub-area of the predetermined image area as the area monitored for a predetermined amount of image change in the image area and providing a first output signal upon detection of a predetermined amount of image change in the first predetermined sub-area image area of the predetermined image area;
- an infrared sensor unit for monitoring a second predetermined area including a first infrared detector with a first filter for providing a pass through of radiation of approximately 10 mm in wavelength to receive radiation from a human body and a second infrared detector with a second filter for providing a pass through of radiation of approximately 4.3 mm in wavelength to receive radiation from a flame;
- a judging unit connected to the infrared sensor unit for receiving an input from the first infrared detector and determining when a human body is within the second predetermined area and providing a second output signal, and for receiving an input from the second infrared detector and determining when a flame is within the second predetermined area and providing a third output segment; and an auto-dialing instruction originating section operatively connected to the first telephone for calling the second telephone automatically based on the receipt of one of the first output signal, second output signal and third output signal.

29. The surveillance system according to claim 28 wherein the first telephone has a chargeable battery and further including a holder assembly for removably mounting the first telephone for charging the chargeable battery, the infrared sensor unit and judging unit is mounted on the holder assembly and operatively connected to the auto-dialing instruction originating section.

30. The surveillance system of claim 29 wherein the image sensor assembly is mounted on a daughter device that is separate from and operatively connected to the first telephone.

31. The surveillance system of claim 29 wherein the holder assembly for mounting the first telephone provides a rotational adjustment of the first telephone to define the predetermined image area.

* * * * *